United States Patent [19]

Sawai et al.

[11] Patent Number: 5,775,283
[45] Date of Patent: Jul. 7, 1998

[54] INTAKE CONTROL SYSTEM FOR ENGINE

[75] Inventors: Seiji Sawai; Kunihiko Nakajima; Jiro Watase. all of Iwata, Japan

[73] Assignee: Yamaha Hatsudoki Kabushiki Kaisha. Iwata, Japan

[21] Appl. No.: 450,256

[22] Filed: May 25, 1995

[30] Foreign Application Priority Data

| May 31, 1994 | [JP] | Japan | 6-118269 |
| Nov. 15, 1994 | [JP] | Japan | 6-280188 |

[51] Int. Cl.⁶ .............. F02B 29/08; F01L 13/00; F02D 9/02
[52] U.S. Cl. ............... 123/184.53; 123/316
[58] Field of Search ............ 123/316, 184.53, 123/184.55, 184.56, 184.57

[56] References Cited

U.S. PATENT DOCUMENTS

| 4,232,641 | 11/1980 | Curtil | 123/316 |
| 4,805,573 | 2/1989 | MacFarlane et al. | 123/184.53 |
| 4,986,225 | 1/1991 | Wu et al. | |
| 5,253,614 | 10/1993 | Matsuo et al. | 123/184.53 |

FOREIGN PATENT DOCUMENTS

| 0194503 | 9/1986 | European Pat. Off. |
| 0344780 | 12/1989 | European Pat. Off. |
| 1517920 | 6/1968 | France. |
| 2439300 | 5/1980 | France. |
| 7135255 | 8/1982 | Japan | 123/184.56 |
| 63-45490 | 9/1989 | Japan. |
| 1305125 | 12/1989 | Japan. |

OTHER PUBLICATIONS

Patent Abstracts of Japan, vol. 012 No. 424 (M-761), 10 Nov. 1988 & JP-A-63 159618 (Mazda Motor Corp) 2 Jul. 1988.
Patent Abstracts of Japan, vol. 008 No. 258 (M-340), 27 Nov. 1984 & JP-A-59 131724 (Nippon Denso KK) 28 Jul. 1984.
Patent Abstracts of Japan, vol. 010 No. 109 (M-472) 23 Apr. 1986 & JP-A-30 240822 (Madza KK) 29 Nov. 1985.
European Search Report.

*Primary Examiner*—Marguerite McMahon
*Attorney, Agent, or Firm*—Knobbe, Martens, Olson & Bear LLP

[57] ABSTRACT

A number of embodiments of induction systems for internal combustion engines that permit operation on the Miller cycle without introducing pumping losses or by substantially minimizing the pumping losses. Basically, the system provides a variable volume air chamber that supplies the major portion of the intake charge or all of the intake charge under low-speed, low-load conditions. Various valving and variable volume chamber constructions are illustrated. In addition, embodiments using air-assisted fuel injection are also disclosed.

35 Claims, 36 Drawing Sheets

INTAKE CONTROL SYSTEM FOR ENGINE

BACKGROUND OF THE INVENTION

This invention relates to an intake control system and induction method for an internal combustion engine.

It is known that in internal combustion engines, pumping losses occur in the charging and discharge of the combustion chambers. These reduce not only thermal efficiency of the engine, but offer a limit to the maximum fuel economy that can be achieved. This problem is particularly acute in the low load range since the amount of intake air is controlled by throttling and this further provides an increase in the pumping losses because of reduced pressure in the intake passage.

There have been proposed arrangements for operating on a so-called Miller cycle to reduce the pumping losses by decreasing the negative pressure in the induction system in the low range operation. This is done by closing the intake port during the middle of the intake stroke and thus shortening the effective intake stroke of the engine. The air taken into the cylinder before the piston reaches bottom dead center thus expands to create a refrigeration cycle that reduces pumping losses and improves thermal efficiency.

Various arrangements have been proposed, however, for attempting to improve on the systems. In a first of these arrangements, parallel first and second intake passages serve the intake port of the engine and one of these is provided with a throttle valve that controls the engine speed in a normal fashion. A control valve is provided in the second passage which is closed during the intake cycle and opened at other times in an effort to control the volume of air that is inducted without throttling. However the pumping losses increase because a negative pressure is produced when the second control valve is closed in the middle of the intake stroke at low load and low speed.

A further type of arrangement which is intended to avoid the problems aforenoted does not control the amount of air by closing the second control valve, but rather supplies a suitable amount of air on the upstream side of the intake valve before the intake valve opens. Such a system includes one fixed volume intake passage and a bypass passage charges this intake passage with atmospheric air at a time when the intake port is closed. However, because the volume of the intake passage is fixed, there are still pumping losses under some running conditions. As shown in the pressure diagram of FIG. 1, which is a pressure diaphragm for an engine operating on such a system, pumping losses occur due to the fact that the shaded portion during the intake cycle, which is below atmospheric pressure, causes a pumping loss $W_2$.

It is, therefore, a principal object of this invention to provide an improved induction system and method for introducing a charge to an engine that will reduce pumping losses and still provide good performance.

SUMMARY OF THE INVENTION

A first feature of this invention is adapted to be embodied in an induction system for an internal combustion engine having a combustion chamber with a volume that varies cyclically during a cycle of engine operation. An intake port admits an intake charge to the combustion chamber. Means cyclically open and close the intake port during the engine cycle for controlling the admission of an air charge to the combustion chamber. Means define an air chamber that communicates with the intake port for supplying a charge to the intake port and the combustion chamber at times when the intake port is open. Means are provided for varying the effective volume of the air chamber in response to at least one engine running condition during at least a range of operation of the engine for varying the volume of air which is supplied to the combustion chamber from the air chamber. Control valve means communicate atmospheric air to the air chamber during a portion of the engine cycle when the intake port is closed.

Another feature of the invention is adapted to be embodied in a method for inducting an air charge into an internal combustion engine having a combustion chamber that is served through an intake port. The intake port is opened and closed cyclically during the operation of the engine for controlling the admission of an air charge to the combustion chamber. In accordance with the method for practicing this embodiment of the invention, a variable volume air chamber communicates with the intake port for supplying an air charge to the intake port and the combustion chamber at the times when the intake port is open. The volume of this air chamber is varied in response to at least one engine running condition during at least a range of operation of the engine for varying the volume of air which can be supplied to the combustion chamber from the air chamber. Means are provided for recharging the air chamber with atmospheric air during a time when the intake port is not open.

DETAILED DESCRIPTION OF THE PREFERRED EMBODIMENTS OF THE INVENTION

Figure 1:
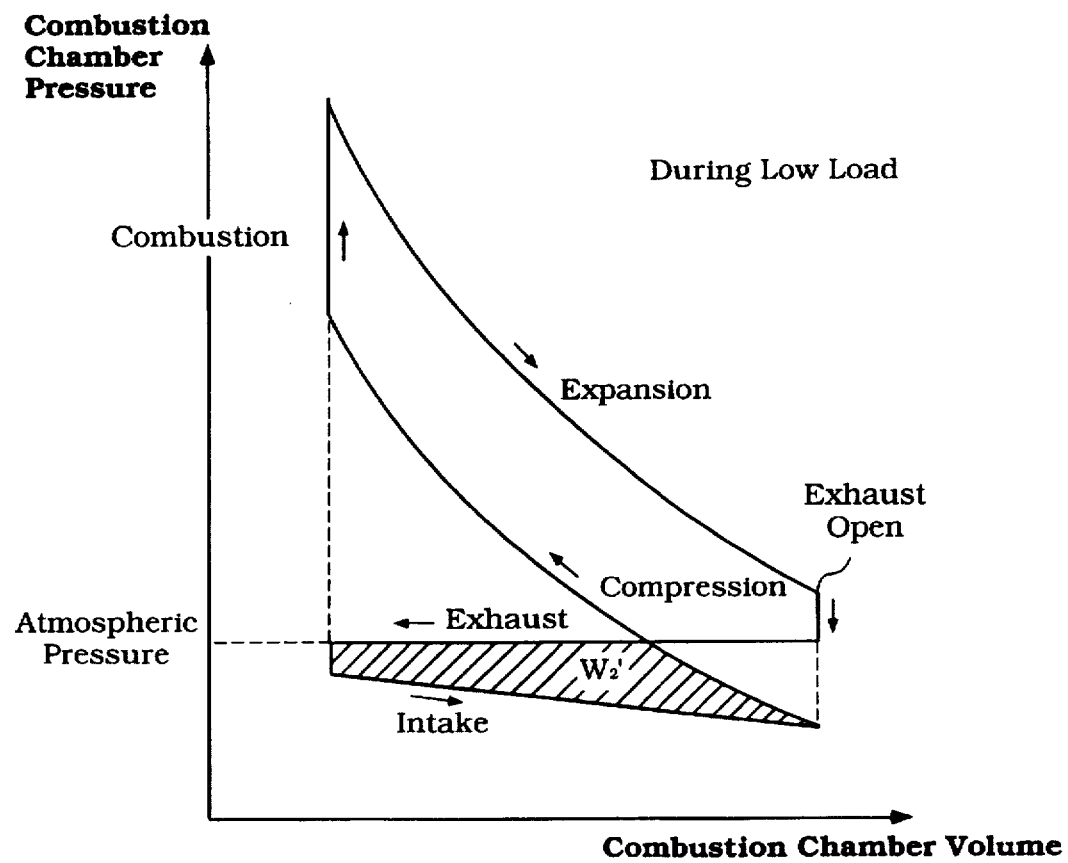
FIG. 1 is a graphical pressure indicator curve of a prior art engine as described during a complete engine cycle beginning with an intake phase, passing through a compression and combustion phase, an expansion phase, and an exhaust phase.
Figure 2:
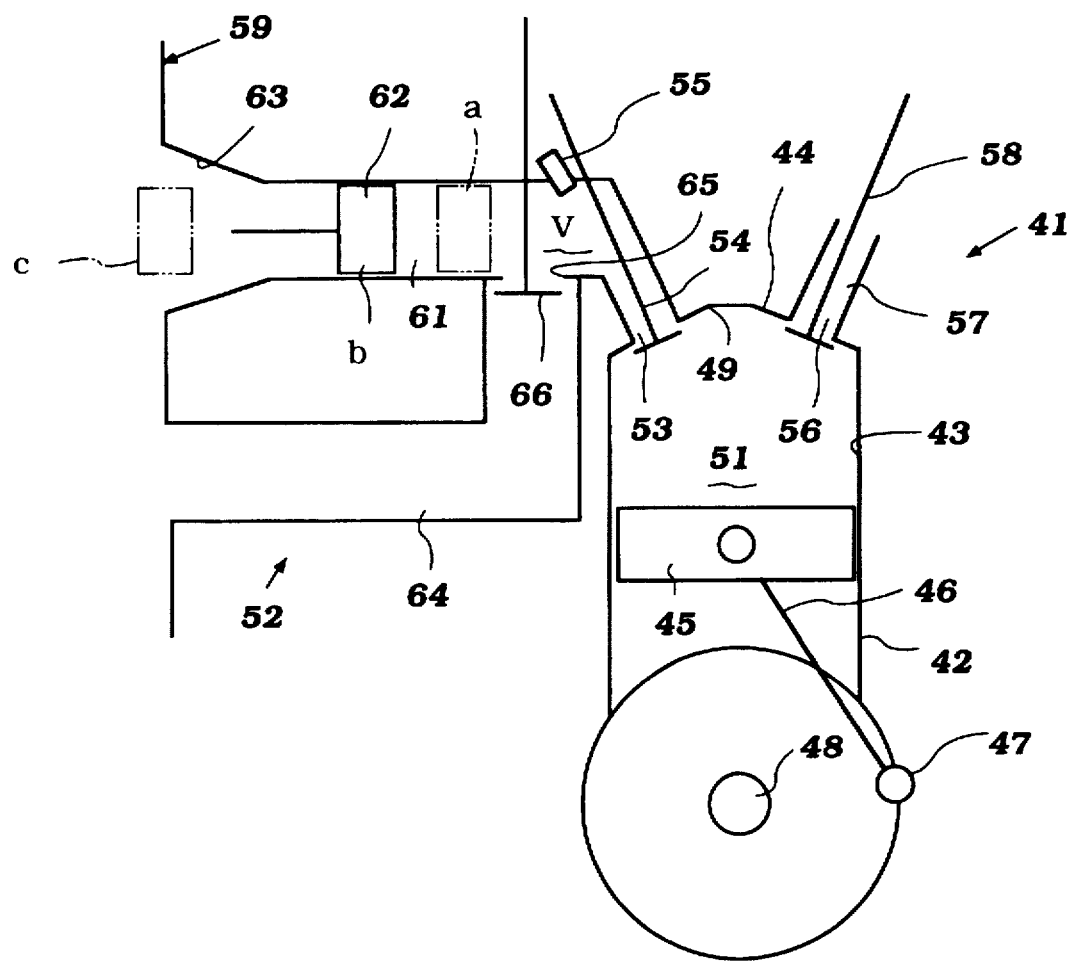
FIG. 2 is a partially schematic cross-sectional view showing a single cylinder of an engine incorporating an induction system in accordance with an embodiment of the invention.
Figure 3:
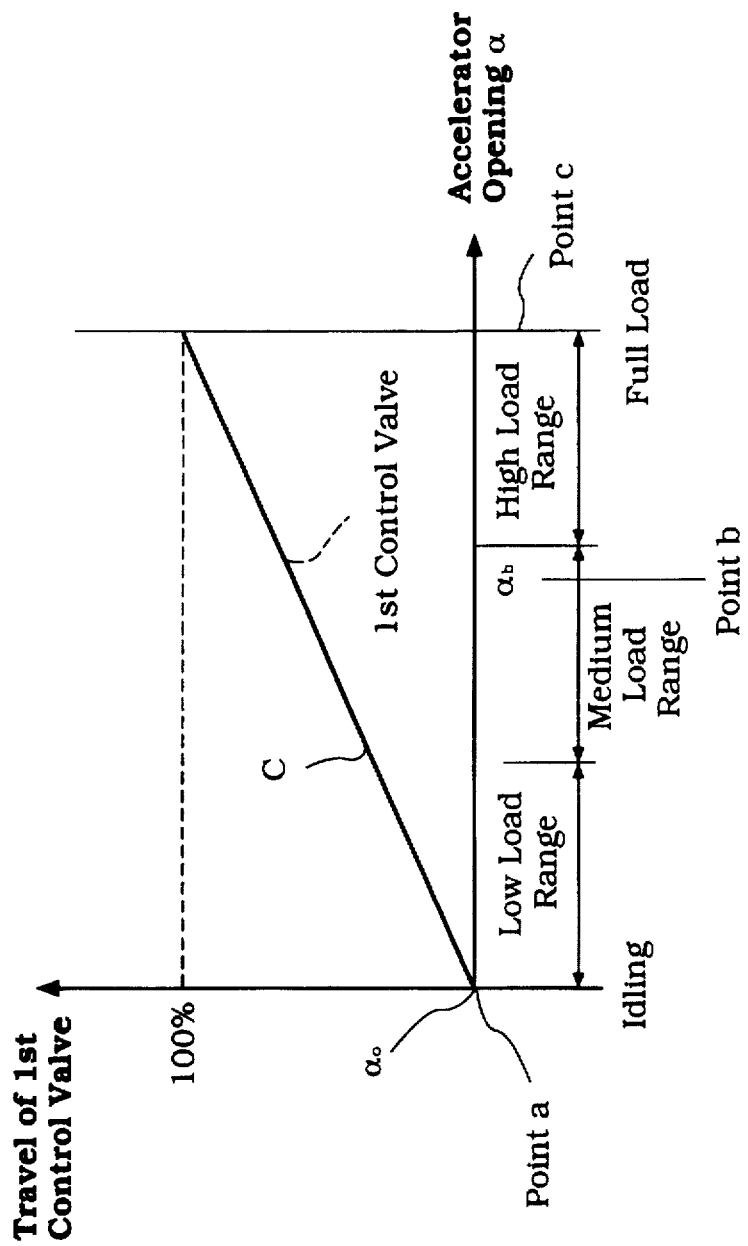
FIG. 3 is a graphical view showing the control ranges of the engine between idle and full load and shows the relationship of the various flow controlling and volume controlling valves of the system.
Figure 4:
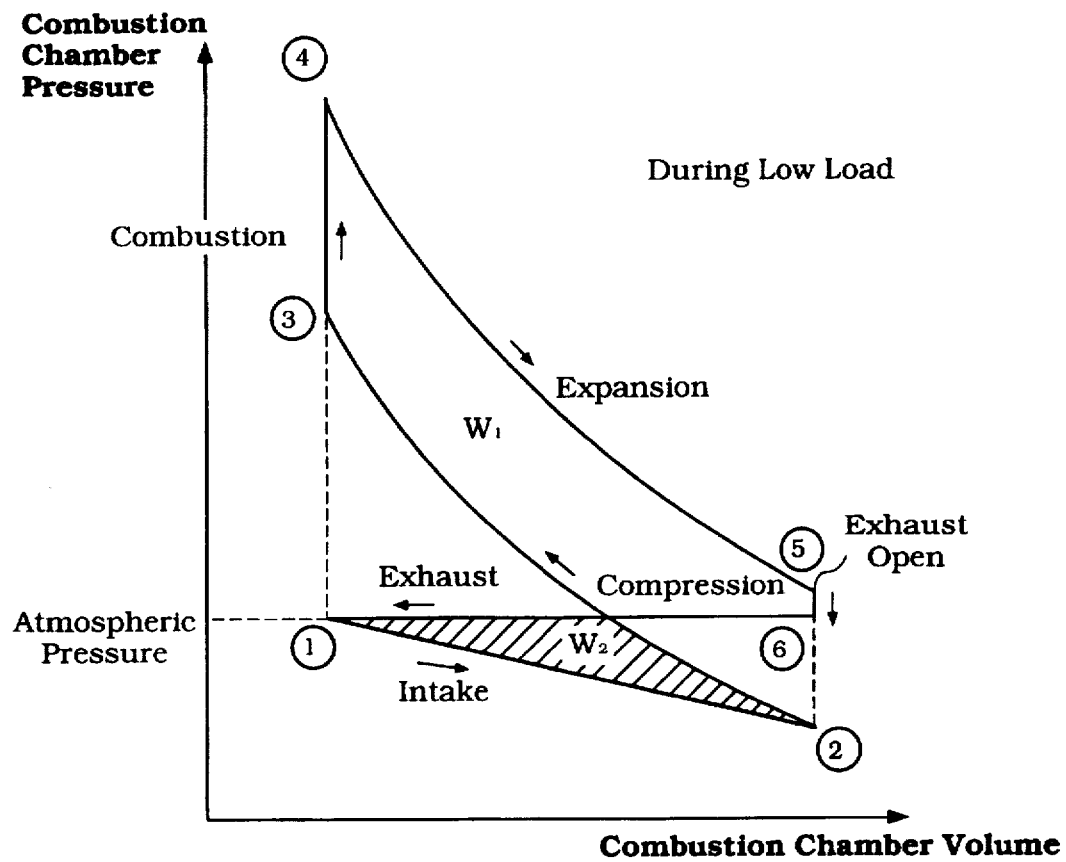
FIG. 4 is a pressure indicator curve, in part similar to FIG. 1, but shows the principle under which the invention operates and how pumping losses are reduced with the invention.
Figure 5:
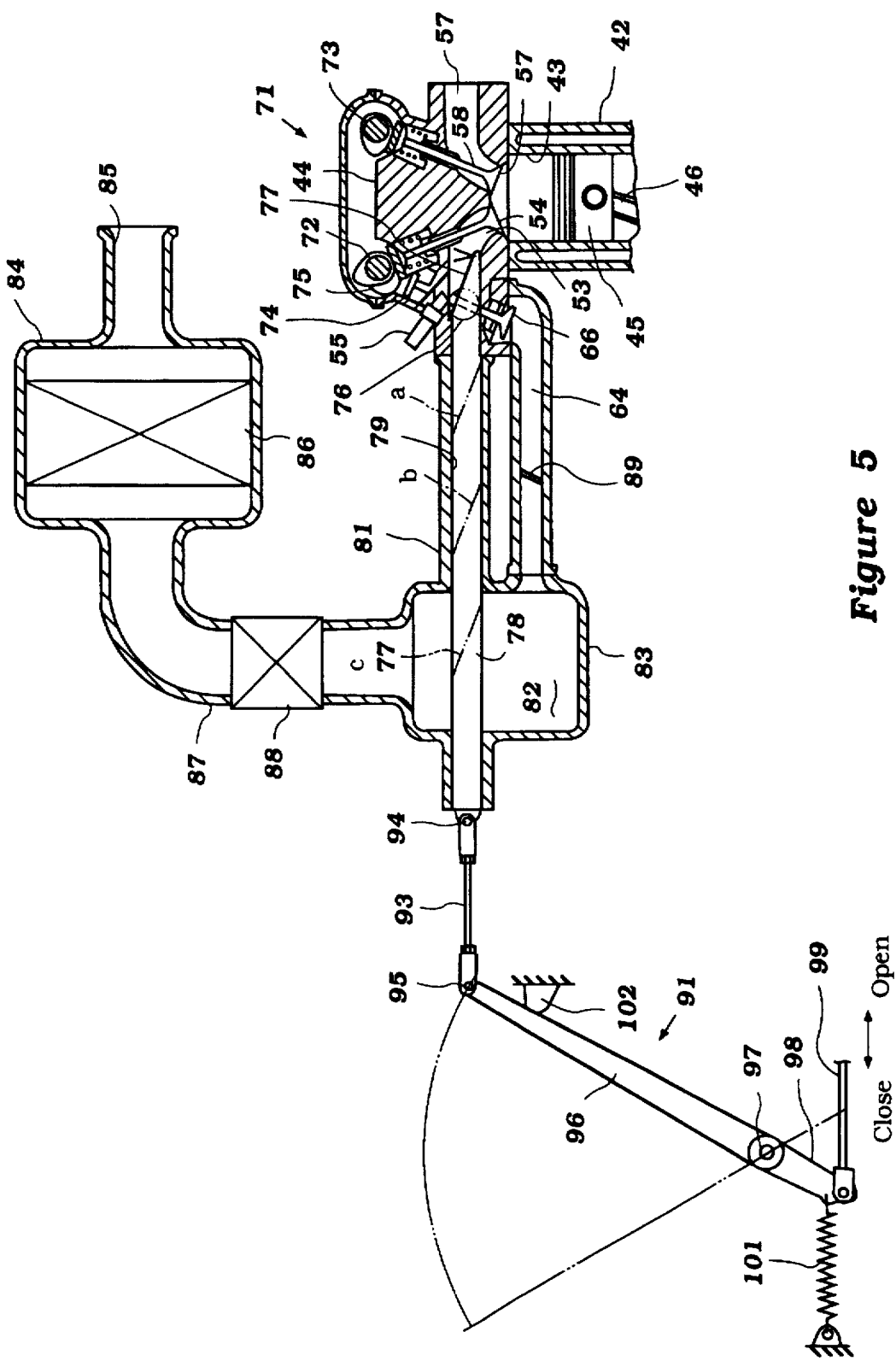
FIG. 5 is a partial cross-sectional view of a physical embodiment of the engine shown schematically in FIG. 2.
Figure 6:
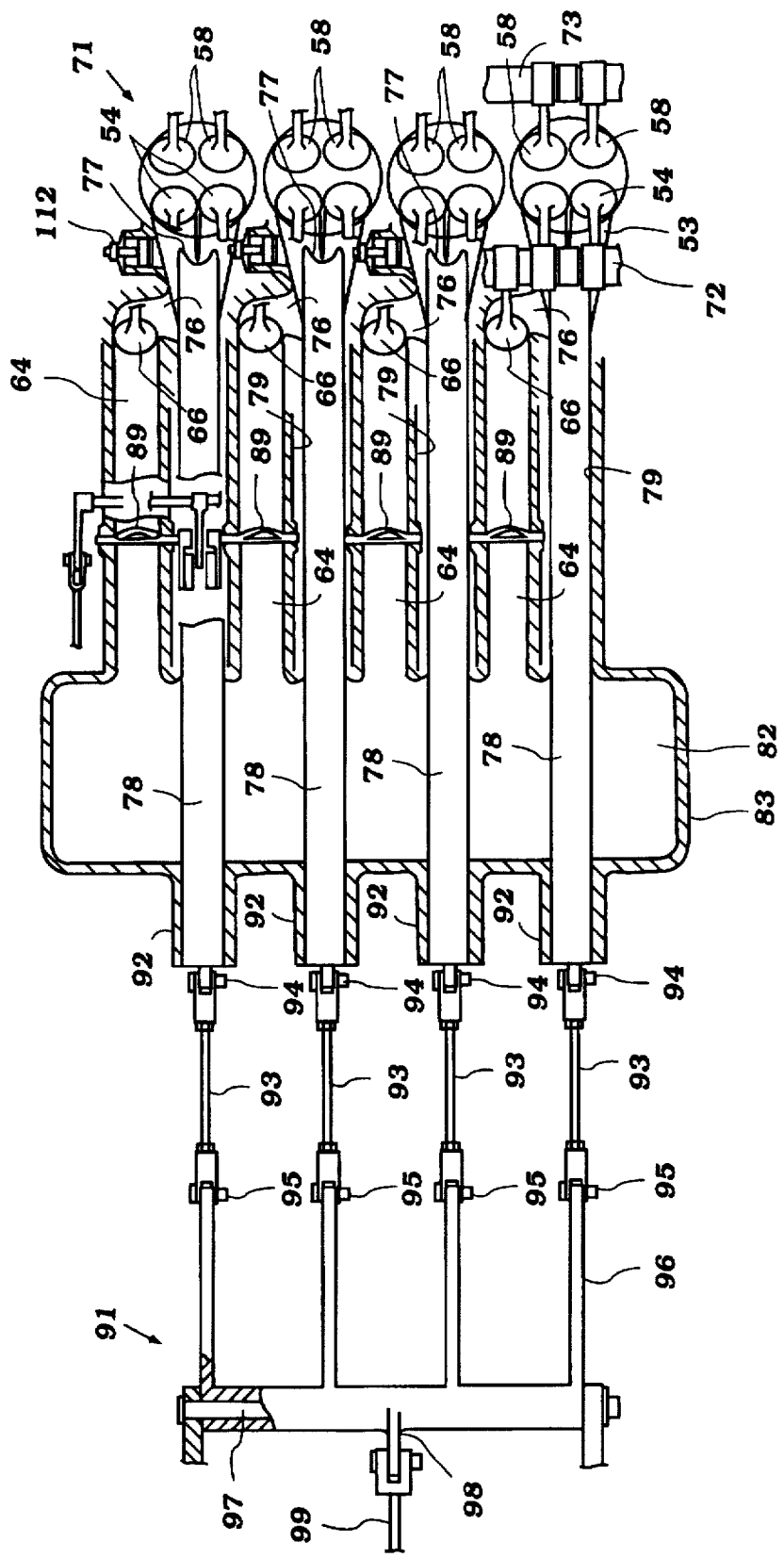
FIG. 6 is a top plan view, with portions broken away and shown in sections of this embodiment and shows how the individual controls for the individual cylinders are interrelated.

Referring now in detail to the drawings and first to the embodiment of FIGS. 2–4, an internal combustion engine constructed in accordance with this embodiment of the invention is identified generally by the reference numeral 41. In this embodiment, the engine 41 is shown primarily in schematic form. In connection with certain other embodiments, and more specifically that of FIGS. 5–9, more details of the actual engine construction are illustrated. Since the invention deals primarily with the induction system and the control therefor, the basic configuration of the engine may be of any known type. For that reason, the drawings show the engine only schematically in some instances and in other instances, although actual details are depicted, the entire engine construction is not illustrated. It will be apparent to those skilled in the art from the following description how the invention can be employed with any engine having known types of basic engine architecture. Also, the number of cylinders and their configuration may be varied in accordance with the desired application.

The engine 41 includes a cylinder block 42 having one or more cylinder bores 43 which are closed by a cylinder head 44 that is affixed to or formed integrally with the cylinder block 42 in any known manner. Pistons 45 reciprocate in the cylinder bores 43 and are connected to the small or upper ends of connecting rods 46. These connecting rods 46 have their lower or big ends journalled on the throws 47 of a crankshaft 48. The crankshaft 48 is rotatably journalled in a known manner in a crankcase chamber that is formed at the base of the cylinder block 42.

The head of the piston 45, the cylinder bore 43, and a recess 49 of the cylinder head 44 form a chamber 51 which has a volume that varies cyclically as the piston 45 reciprocates in the cylinder bore 42. This chamber 51 is referred to hereinafter as the combustion chamber.

An induction system, indicated generally by the reference numeral 52, supplies a fuel air charge to the combustion chamber 51. This charge is supplied through one or more intake ports 53 formed in the cylinder head 44 and which are formed by valve seats fixed or pressed in the cylinder head 44 in a known manner. Poppet-type intake valves 44 are slidably supported in the cylinder head 44 and actuated, preferably but not necessarily, by an overhead camshaft (not shown in this figure but illustrated in later embodiments). It is to be understood that the invention may be employed with engines having one or more intake valves per cylinder.

A fuel injector 55 is mounted in the cylinder head 44 and injects fuel into the cylinder head intake passage in a direction toward the intake port 53.

The charge which has been delivered to the combustion chamber 51 by the induction system 52 and fuel injector 55 is fired by a spark plug that is mounted in the cylinder head 44 in a known manner. Obviously, one or more spark plugs may be employed for each cylinder.

The burnt charge is then discharged at the appropriate timing through an exhaust port 56 formed in the cylinder head 44 by a valve seat that is pressed or cast therein. This exhaust port 56 is formed at the inlet end of an exhaust passage 57 and the flow into this exhaust passage 57 is controlled by an exhaust valve 58. The exhaust valve 58 is operated by an overhead camshaft in a preferred embodiment. This camshaft is not shown in this figure, but like the intake camshaft is shown and will be described by reference to later embodiments.

As has been noted, the construction as thus far described, except for that of the induction system 52 may be of any conventional type.

Referring still to FIG. 2, the induction system 52 includes an air inlet device, shown partially and identified generally by the reference numeral 59. This air inlet device 59 receives atmospheric air. The induction device 59 may incorporate a filter or air cleaner arrangement and additionally may, if desired, include some arrangement for silencing the inducted air flow. Again, this particular portion of the engine 41 forms no part of the invention and, therefore, will not be described again.

The cylinder head intake port 53 is served by a first intake passage 61 of the induction system 52. This first intake passage 61 is configured and is operated so as to provide an air volume V of air which may be inducted when the intake valve 54 is open. The actual volume of the area V is controlled by a sliding piston-type valve 62 (the first control valve) which is actuated in a manner to be described between an idle position a, a mid-range position b, and a full throttle position c. Of course, there are a plurality of intermediate positions between the position a and c.

It will be seen that the passage 61 has a tapered bell mouth end 63 that communicates with the air inlet device 59 so that when the sliding piston 62 is in the position c, the volume V is open to the atmosphere. However, when the piston 62 is in a position in engagement with the portion downstream of the bell mouth 63, the volume V will not directly receive atmospheric air, except as will be described later. The volume is varied in response to engine running conditions under low speed and low load, as aforenoted.

Atmospheric air is delivered to the passage 61 and volume V through a further or second passage 64 of the induction system 52. This passage 64 extends in parallel relationship to the passage 61 and intersects the volume V at a valve seat 65 that is disposed downstream of the idle position a of the sliding piston valve 62. A poppet-type valve 66 which is actuated, in a manner to be described, controls the communication of the volume V through the valve seat 65 with the atmosphere through the passage 64.

Basically, the way the system operates is that when the intake valve 54 serving the combustion chamber 51 is closed, the valve 66, which constitutes the second control valve in this embodiment, is open so that air can enter the volume V from the air inlet device 59 or any other atmospheric air inlet, as will be described later. However, the valve 66 closes before the main intake valve 54 opens. Hence, the amount of air inducted is controlled in this embodiment primarily by the position of the piston valve 62 until it moves to its opened position.

FIG. 3 shows the operational map for the control valve 62, identified in this graph as the first control valve. The sliding piston valve 62 (first control valve) is directly connected to the accelerator control of the engine and is held in the position a at idle. This is indicated as the point $\alpha_0$ in FIG. 3. As the operator depresses the accelerator pedal, the piston 62 will be moved from the position a to the position c. This opening is identified as the point $\alpha$, and it will be seen that through the idle low range and medium range and load conditions, the first control valve 62 provides a volume V of air which flows into the combustion chamber 51 when the intake valve 54 is opened. At this time, the second control valve 66 will be closed. Sometime during this intake charging, the injector 55 will spray fuel that will be mixed with the air and delivered to the combustion chamber 51. The intake valve 54 then closes and the charge is compressed in the combustion chamber 51 as the piston moves upwardly.

Sometime after the intake valve 54 has closed and before it opens again, the valve 66 will open so as to permit the volume V to attain atmospheric pressure. The valve 66 will then close and trap the air to be next inducted in the passage 61 and specifically the volume V.

Sometime before top dead center, the charge will be fired by the spark plug and will cause combustion to occur. This combustion then causes the gases to expand and drive the piston 45 downwardly.

After the expansion of the gas has completed and when the piston 45 again begins to move toward top dead center or immediately before bottom dead center, the exhaust valve 58 will open. Upward movement of the piston 45 will thus cause the burnt charge to be discharged from the combustion chamber 51 through the exhaust passage 57. At or after top dead center, the exhaust valve 58 closes and the intake cycle begins again by opening of the intake valve 54. This opening of the intake valve 54 may overlap slightly the period before the exhaust valve 58 is closed, as is known in this art.

The pressure indicator curve of FIG. 4 shows the intake cycle from points (1) to (2) and the compression between the points (2) and (3). It will be seen that since the intake passage and specifically the volume V is at atmospheric pressure when the intake valve opens, the pumping losses $W_2$ will be substantially reduced from prior art constructions. This figure shows that the indicated work $W_i$ increases because the pumping losses $W_2$ is decreased. That is, the actual engine work $W_i$ is expressed by the following equation:

$$W_i = W_1 - W_2 \tag{1}$$

Thus, as pumping losses $W_2$ decrease, the indicated work $W_i$ will increase and the thermal efficiency N of the engine increases and fuel economy is improved. Thermal efficiency can be expressed as follows:

$$N = A \cdot W_i / Q \tag{2}$$

wherein

A is the thermal equivalent of work and

Q is the amount of heat supplied

In addition to improving thermal efficiency and output, the invention also further permits smoother running, particularly if high power outputs are to be achieved by providing overlap between the closing of the exhaust valve and the opening of the intake valve. This is done so as to improve engine breathing performance. With prior art type of constructions, however, this large overlap either requires variable valve timing or will result in poor low speed running. This is because of the fact that conventional engines have a reduced pressure or partial vacuum in the volume V immediately before the intake valve 54 opens. As a result of this, when the intake valve opens and the exhaust valve 58 is also opened, some of the exhaust gases will flow to the lower pressure area V and cause exhaust dilution, poor running and unstable idle. However, since the atmospheric pressure is maintained in the volume V in accordance with this invention at the time the intake valve 54 is opened, this problem will not be present and the performance will significantly improve.

As may be seen, the actual volume V which is charged with air at atmospheric pressure is increased as the accelerator demand increases, and hence, this atmospheric air pressure is always maintained when the intake valve 54 is first opened. After a point somewhere between the points b and c, the sliding piston valve 62 will open and the chamber V will no longer be a closed chamber. This occurs at higher load and speed conditions and at these conditions the pumping loss problem and its effect on thermal efficiency is not great. Therefore, the engine operates like a conventional engine at these load and speed ranges.

FIGS. 5–9 show another embodiment of the invention, and in these figures, the components are shown less schematically and more as they would appear in an actual physical embodiment. An engine constructed in accordance with this embodiment is identified generally by the reference numeral 71 and the components which are the same as those of the previously described embodiment have been identified by the same reference numerals. Where the components are the same or have the same function, they will not be described again, except insofar as is helpful in understanding this embodiment and also so as to permit those skilled in the art to understand how the invention can be practiced in conjunction with an actual physical embodiment.

The intake and exhaust camshafts, previously referred to, are actually shown in this figure and are identified by the reference numerals 72 and 73. Except as will be described, these camshafts may be seen to be of the conventional type.

It will also be seen that the second control valve 66 has its stem portion disposed in a cam chamber 74 of the cylinder head 44. This valve 66 is operated by a further lobe 75 formed on the intake camshaft 72 in this embodiment, and thus its opening and closing is controlled in timed relationship to the rotation of the intake camshaft 72.

This second control valve 66 controls the communication of the intake passage 64 with the volume 53 through a port 76 which is also partially valved by a tapered end portion 77 of a sliding piston-type first control valve, indicated generally by the reference numeral 78, but which has the same function as the sliding piston valve 62 of the previously described embodiment in varying the volume V. This sliding piston valve 78 is slidably received in a complementary shaped passage 79 formed in an intake manifold runner 81 and which is equivalent to the first passage 61.

The passages 79 for all cylinders and the atmospheric inlet passages 64 communicate with a plenum chamber volume 82 formed by a plenum chamber 83. The plenum chamber 83 receives atmospheric air from an atmospheric air inlet device 84 having an atmospheric inlet opening 85. A filter element 86 is interposed between the air inlet opening 85 and a further passageway 87 that communicates the air inlet device 84 with the plenum chamber 83 and specifically its volume 82. An air flow meter 88 is positioned in the passageway 87 for measuring the total air flow to the engine 71 for controlling the amount of fuel supplied by the fuel injectors 55.

In this embodiment, a third control valve, indicated by the reference numeral 89, is provided in the passages 64, and these passages 64 communicate with the plenum chamber 82 upstream of the third control valves 89.

This embodiment also shows how the sliding piston control valve 78 for each cylinder may be interlinked with each other for use in multiple valve engines. It should be noted that these figures show a four cylinder in-line engine. As aforenoted, the actual number of cylinders and cylinder configurations may be varied. A control mechanism, indicated generally by the reference numeral 91, is provided for operating the sliding piston valves 78 all in unison. The plenum chamber 83 is provided with a plurality of bosses 92 that slidably support the ends of the sliding piston valves 78. Outside of these bosses, there are provided adjustable links 93 which are connected by pivot pins 94 to the sliding pistons 78.

The opposite ends of the links 93 are connected by pivot pins 95 to a multiple arm bellcrank assembly 96 which is pivotably supported on a pivot pin 97. A further arm 98 of the bellcrank 96 is connected by a throttle rod 99 to the remotely positioned operator controlled accelerator mechanism.

A coil compression spring 101 acts on the bellcrank arm 98 and urges the bellcrank 96 in a clockwise direction to the idle position, wherein the bellcrank 96 contacts an idle stop 102.

Figure 7:
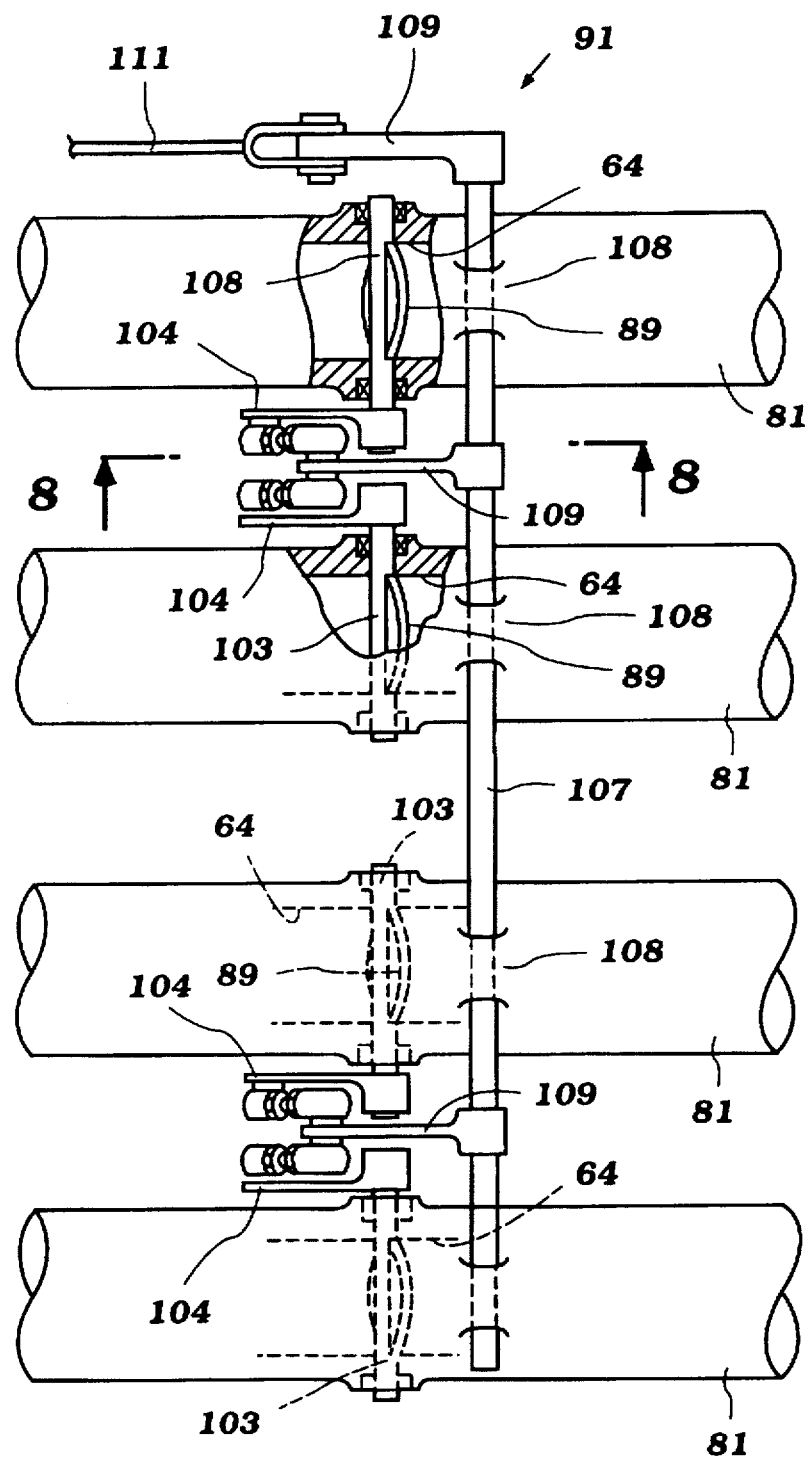
FIG. 7 is a further enlarged top plan view of the portion of the structure shown in FIG. 6.
Figure 8:
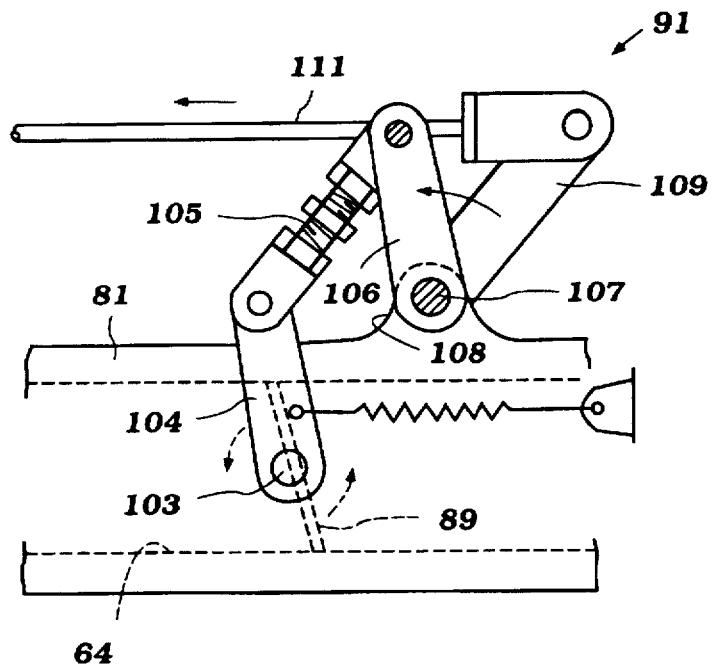
FIG. 8 is a side elevational view taken in the direction of the line 8—8 of FIG. 7 and shows how the mechanism operates and how fine adjustments can be made.

The control mechanism for controlling the position of the third control valves 89 will now be described by primary reference to FIGS. 7 and 8. It should be seen that these third control valves 89, which comprise butterfly-type valves, are each affixed to a respective control valve shaft 103 that is journalled appropriately in the respective manifold runner 81. Levers 104 are connected to the adjacent ends of the pairs of control valve shafts 103, as shown in FIG. 7. The outer ends of the levers 104 are connected by means of turn buckle-type adjusting mechanisms 105 to further control levers 106 which are fixed on a common control valve shaft 107. This control valve 107 is journalled on bosses 108 formed on the manifold runners 81.

A control lever 109 is affixed to one end of the control valve shaft 107 and is coupled by a wire actuator 111 to the accelerator pedal.

Figure 9:
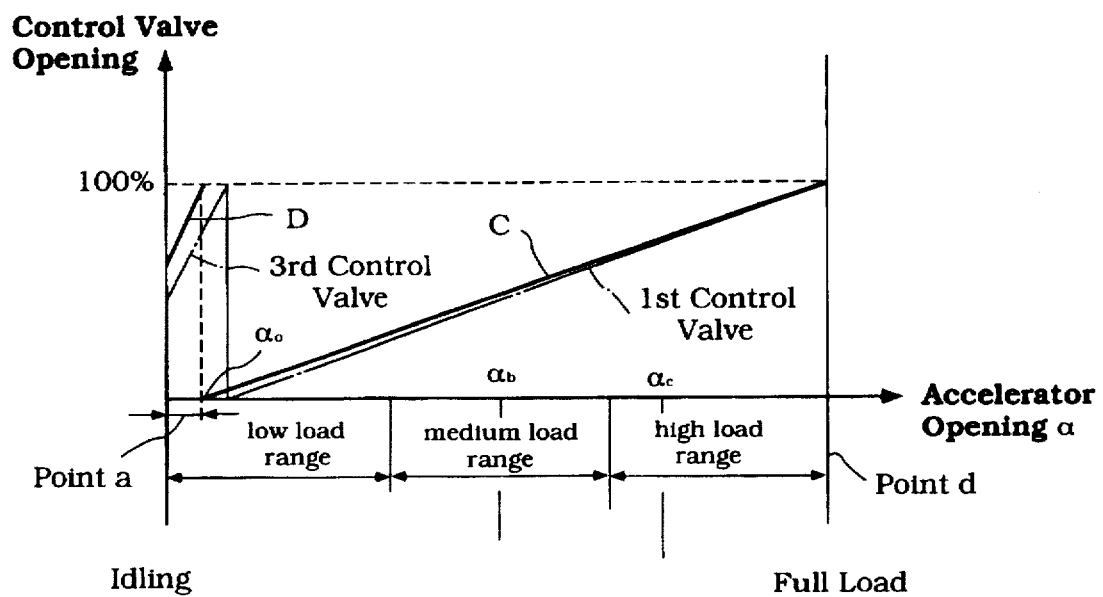
FIG. 9 is a graphical view showing a control map for the operation of the various flow controls of this embodiment and also for a later embodiment.

This connection is such that the third control valves 89 will be actuated before the first control valve pistons 78, as may be best seen in FIG. 9. That is, the operation is such that at idling, the control valves 89 and control pistons 78 are not moved and are held in their idle positions. In order to provide fine tuning for the volume V under this condition, there are provided a plurality of small adjustable volume chambers, indicated at 112 in FIG. 6, which may permit individual adjustment. The adjustable links 105 permit the synchronization of the position of the third control valves 89 under this same condition.

As the throttle is opened from the idle position a to an off-idle position $\alpha_o$, the third control valves 89 are moved between their fully closed position and their fully opened position. During this time, the flow of atmospheric air to the volume V is controlled by the third control valves 89 and the sliding piston control valves 78 are not operated.

Once the throttle position $\alpha_o$ is reached, at the point a, then the sliding piston valves 78 are opened, as previously described. This opening continues through the point d and up through a point when the sliding piston control valves 78 move within the plenum chamber 82, as shown in the phantom line view of FIG. 5. Hence, the operation of this embodiment is the same as that previously described, but for the addition of the third control valves which provides a more accurate and finer control.

Thus, this embodiment also has the advantages of that previously described, in that pumping losses are reduced, actual work is increased, and large overlaps can be employed to increase high speed performance without deteriorating idle or low speed running.

If the intake volume V when the sliding piston control valves 78 are in the position a can be made very small, then the use of the third control valves 89 may be dispensed with. However, this arrangement accommodates better an actual physical construction.

Figure 11:
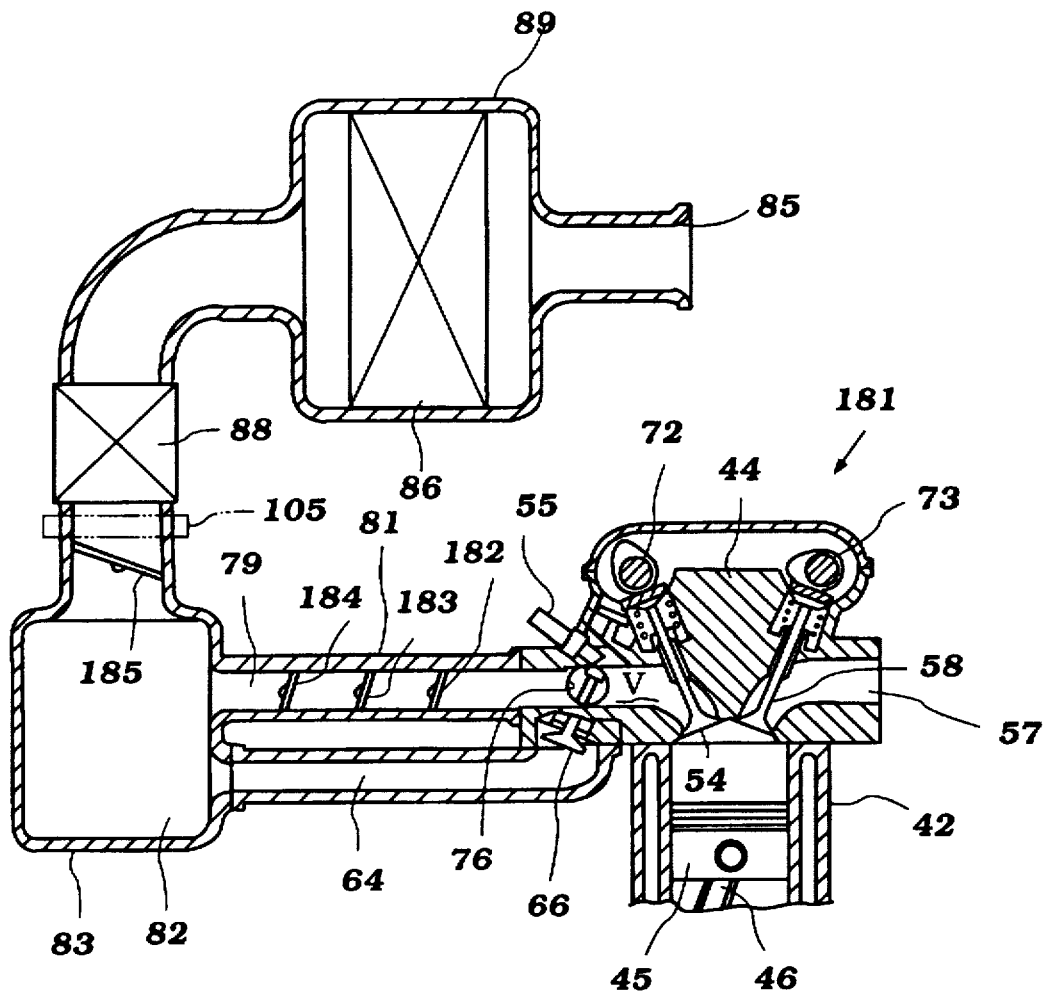
FIG. 11 is a partial cross-sectional view, in part similar to FIGS. 5 and 10, and shows a further embodiment of the invention.

In this embodiment of FIGS. 5–9, the third control valves 89 have been positioned downstream of the plenum chamber 82 and one within each second induction passage 64. It may also be possible to provide a single common third control valve in the upstream portion of the structure, and such an embodiment is shown in FIG. 11 and will be described later by referenced to that embodiment.

In the embodiment of FIGS. 5–9, the air flow meter, indicated generally by the reference numeral 88, was positioned upstream of the plenum chamber 82 for measuring the air flow to the engine. This provided the basis on which the air/fuel ratio could be set by controlling the amount of fuel supplied to the fuel injectors 55. Rather than providing an air flow meter 88, it is possible to actually measure the pressure in the closed volume V at certain running conditions, and from this value determine the amount of fuel necessary to provide the required air/fuel ratio.

In the embodiments of the invention as thus far described, when the first sliding piston control valves (valve 62 of FIGS. 2–4 and valve 78 of FIGS. 5–9) have reached their nearly wide-open throttle positions at the high speed end, their respective induction passages 61 or 79 have communicated with the same air source as the secondary induction passages 64.

Figure 10:
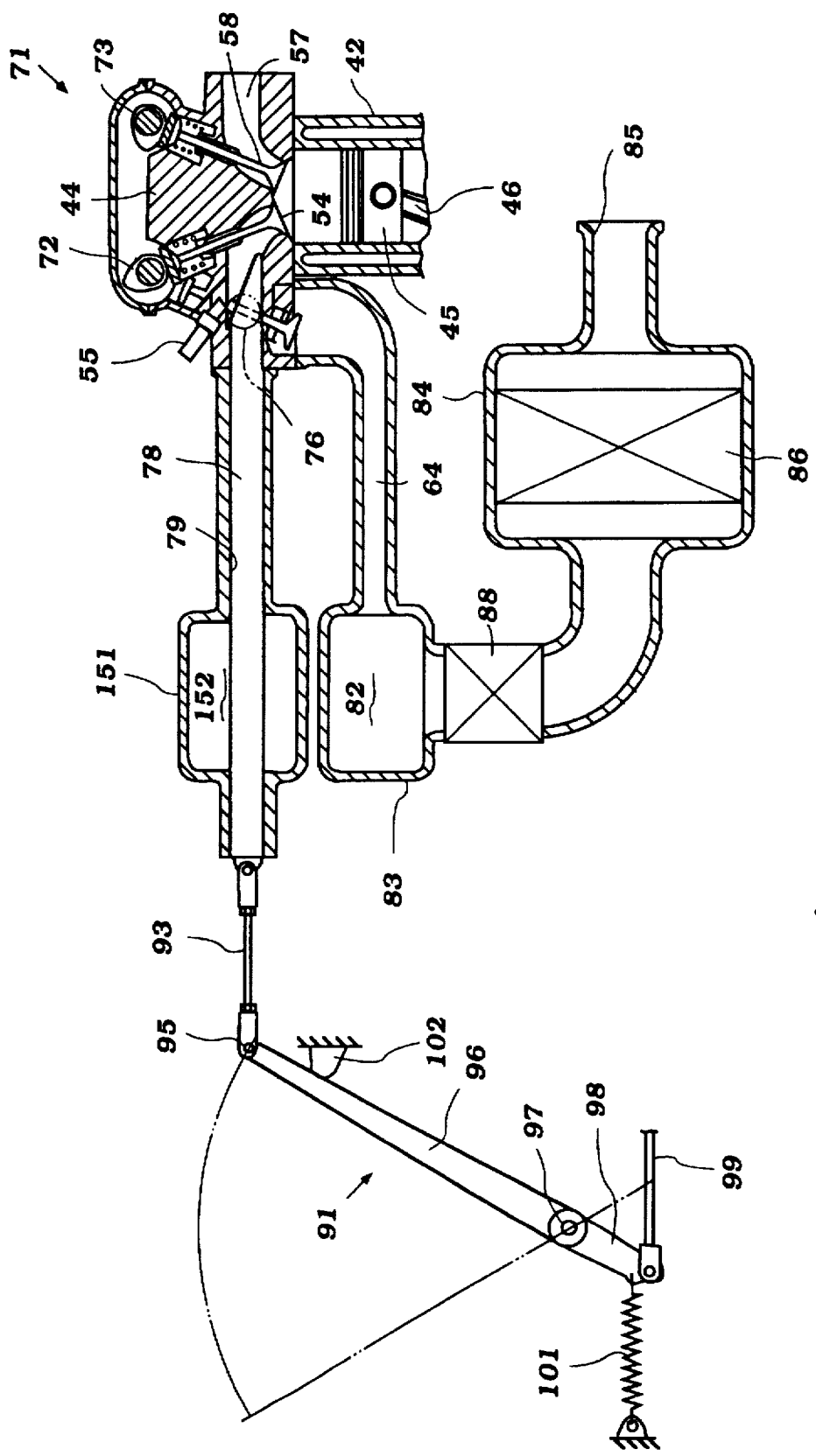
FIG. 10 is a partial cross-sectional view, in part similar to FIG. 5, and shows another embodiment of the invention.

FIG. 10 shows another embodiment of the invention which is the same as the embodiment of FIGS. 5–9, except that in this case, the intake passages 79 do not have a direct atmospheric air inlet. Since this is the only difference, only one figure is employed to show this embodiment, this being a figure corresponding to FIG. 5. Also, since the construction is basically the same, except for this difference, components which are the same or substantially the same have been identified by the same reference numerals and will be described again only insofar as is necessary to understand the construction and operation of this embodiment.

In this embodiment, each of the sliding piston valves 78 has its back side slidably received in a box-like assembly 151 that defines an internal chamber 152 in which the valves 78 are slidably supported and into which they move at a point between the previously noted positions b and c. However, the chamber 152 has no atmospheric air inlet opening, and hence, under high load conditions, all of the atmospheric air is provided primarily through the air inlet device 84.

Some flow, however, may pass from the portions of the chambers 152 from one cylinder to the other under these running conditions. In all other regards, this embodiment is the same and operates the same as those previously described and, for that reason, further description of this embodiment is not believed to be necessary to permit those skilled in the art to practice it.

This embodiment also provides another type of effect which improves charging efficiency inasmuch as the primary intake passage 79 does not communicate within the atmospheric air directly. This is, when the volume V is relatively large, then after the control valve 66 is opened, the air flow will tend to go toward the first control valve 78 and away from the intake valve seat 53. This will provide a lower pressure adjacent the intake valve seats 53 than in the remainder of the volume V. Hence, when the control valve 66 is closed, and the intake valve 54 is opened, there will be a large pressure difference which will cause the air adjacent the sliding control valve 78 to move rapidly through the intake port 53 into the combustion chamber 51 so as to provide a ram supercharging effect.

Figure 12:
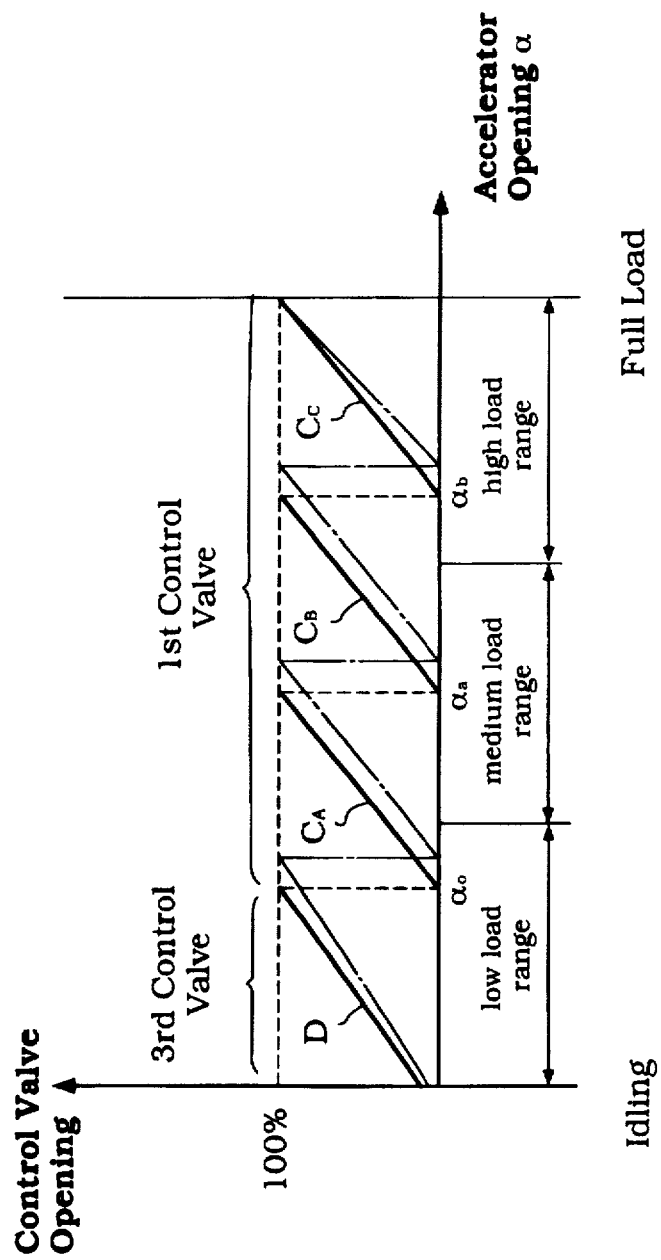
FIG. 12 is a graphical control map showing the operation of the various control valves of the embodiment of FIG. 11 and of a later embodiment.

FIGS. 11 and 12 show another embodiment of the invention which is generally the same as those embodiments already described. This embodiment differs from those previously described in two regards. First and as has been noted in conjunction with the discussion of an alternative construction of the embodiment of FIGS. 5–9, the third control valve is positioned upstream of the plenum chamber 83. Second, rather than using a sliding piston control first valve, butterfly-type first control valves are provided for varying the volume V of the induction passage 79. In addition, this embodiment shows the possible utilization of a supercharger or turbocharger in conjunction with the induction system. Components which are the same or substantially the same as those previously described will be identified by the same reference numerals and only the different components will be identified by new reference numerals and will be described in full detail.

The engine in this embodiment is identified generally by the reference numeral 181 and, as has been noted, the basic engine construction is the same as those previously described. Also, as has been noted, the invention can be utilized with a wide variety of basic engine types.

In this embodiment, the first induction passage 79 is provided with three butterfly-type first control valves comprised of a first valve 182 which is disposed relatively close to the communicating passage 76 of the second intake passage 64. Again, it is desired to maintain the initial volume V as small as possible. A further first control valve 183 is positioned in the first intake passage 79 upstream from the control valve 182 so that the volume between the control valve 183 and the intake valve 54 is larger than that between the control valve 182 and the intake valve 54. A final first control valve 184 is positioned still further upstream of the control valves 182 and 183 and thus provides a larger volume between it and the intake valve 54. In this embodiment, the first intake passage 79 communicates directly with the plenum chamber 82, but only when all of the first control valves 182, 183 and 184 are open.

In addition, a third control valve, indicated by the reference numeral 185, is positioned downstream of the air flow meter 84 and upstream of the plenum chamber 82. This third control valve 185 is operated in accordance with a sequence which will be described in conjunction with FIG. 12.

Basically, this system operates by maintaining the first control valves 182, 183 and 184 all in a closed position under the low speed low load range. Under this condition, the third control valve 185 is progressively opened along the line D as shown in FIG. 12 as the accelerator is depressed. When the third control valve 185 is fully opened, then the opening of the initial first control valve 182 is opened in accordance with the curve $C_A$. When the first control valve 182 is fully opened, then the further first control valve 183 is opened as shown by the curve $C_B$, so as to provide a progressively increasing volume V for the primary intake passage 79. Finally, the final control valve 184 is opened as shown by the curve $C_C$.

In this embodiment, since the volume V of the passage 79 is relatively large and cannot be made small, the amount of external air taken into the cylinder, especially during idling, may become excessive. This can cause high engine speed noise and poor fuel economy. Thus, the control valve 185 is provided so as to restrict the air flow under idling and avoid these problems. Furthermore, this system may also be used with the individual throttle valves of the embodiments of FIGS. 5-9 or if the volume V can be kept small enough, the third control valves can be dispensed with completely.

This embodiment and, in fact, the other embodiments, can also be utilized with an intake system supercharger, and such a supercharger is shown in phantom at 105. In this case, the supercharger 105 is provided downstream of the air flow meter 88 and upstream of the plenum chamber 82, although other locations are possible. The use of supercharging is possible because knocking can be prevented, since temperature rise in the mixture due to the supercharging effect at the end of the compression stroke can be restricted by using the cooling effect of the Miller cycle.

Figure 13:
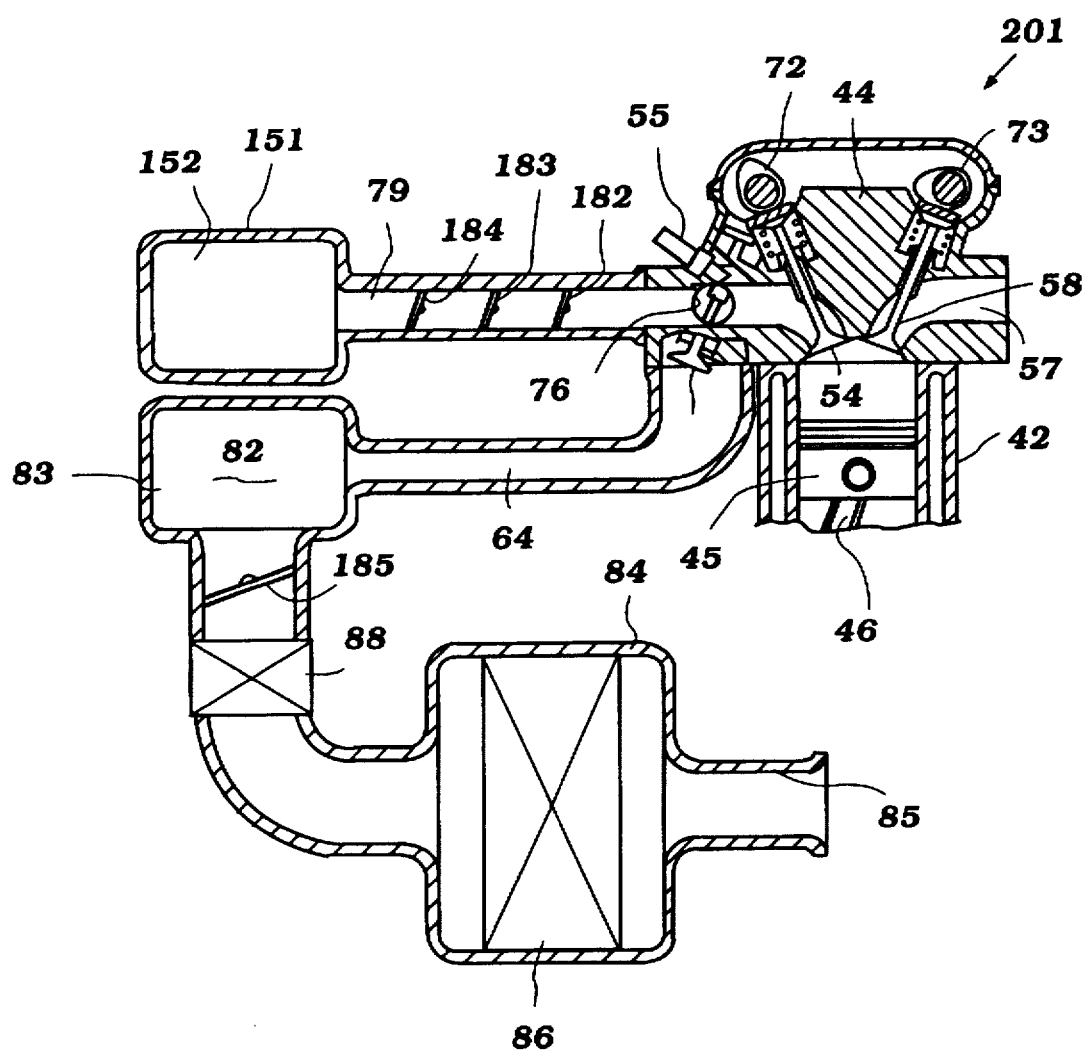
FIG. 13 is a partial cross-sectional view, in part similar to FIGS. 5, 10 and 11, and shows yet another embodiment of the invention.

FIG. 13 shows an engine constructed in accordance with yet another embodiment of the invention, which engine is identified generally by the reference numeral 201. This system employs an induction system that incorporates butterfly-type first control valves, as in the embodiment of FIG. 11. Thus these components have been identified by utilization of the same reference numerals for these components as used in FIG. 11. However, this embodiment also does not provide a separate atmospheric air inlet for the intake passage 79, but rather a common closed plenum chamber, as in the embodiment of FIG. 10. Hence, this plenum chamber is indicated by the reference numeral 151 and having the volume 152, as applied in FIG. 10. Hence, it is believed that the construction and operation of this embodiment and its advantages will be understood from the previous description and, for that reason, it is believed that a further description of this embodiment is not necessary. However, this embodiment also has the inertial supercharging effect, as described in conjunction with the embodiment of FIG. 10, for the same reasons as applied therein.

Figure 14:
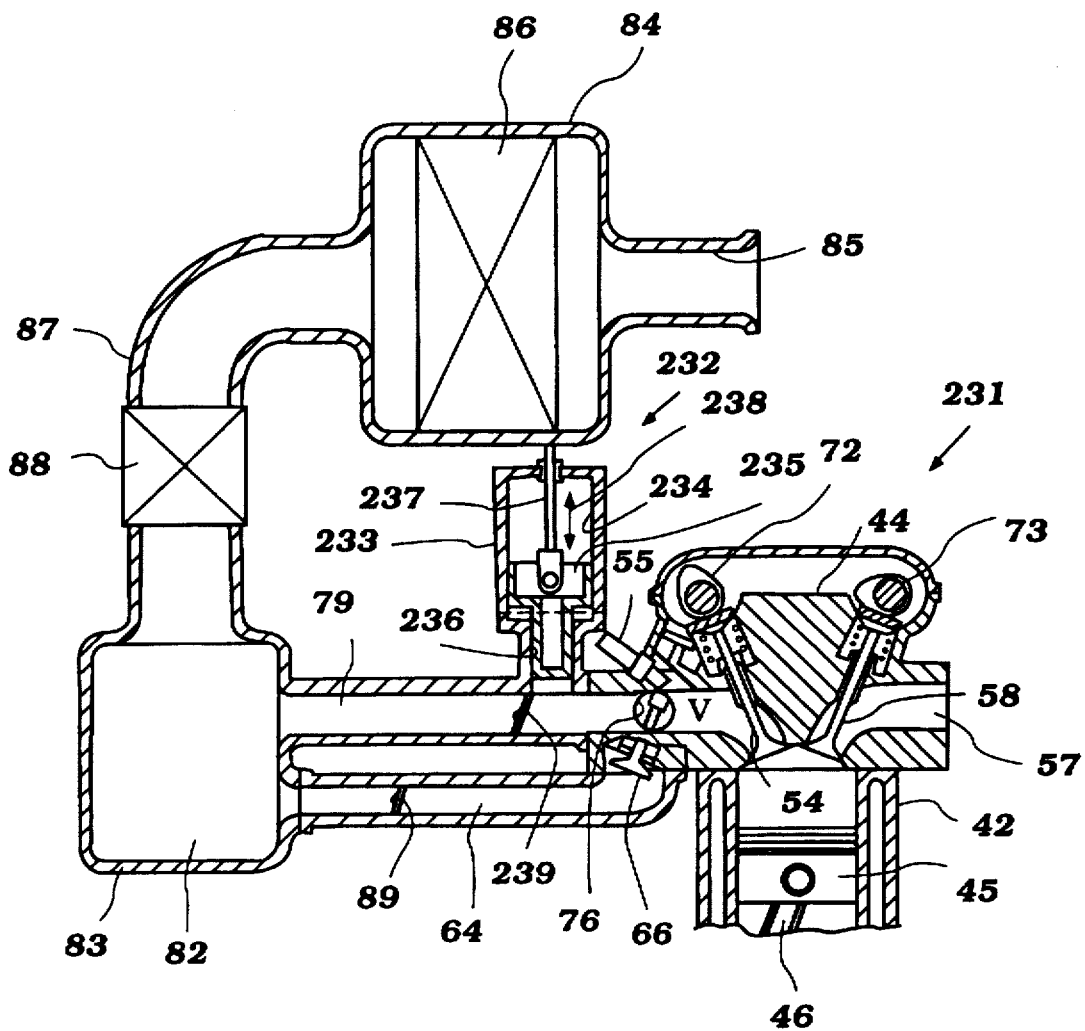
FIG. 14 is a partial cross-sectional view, in part similar to FIGS. 5, 10, 11 and 13, and shows a yet further embodiment of the invention.
Figure 15:
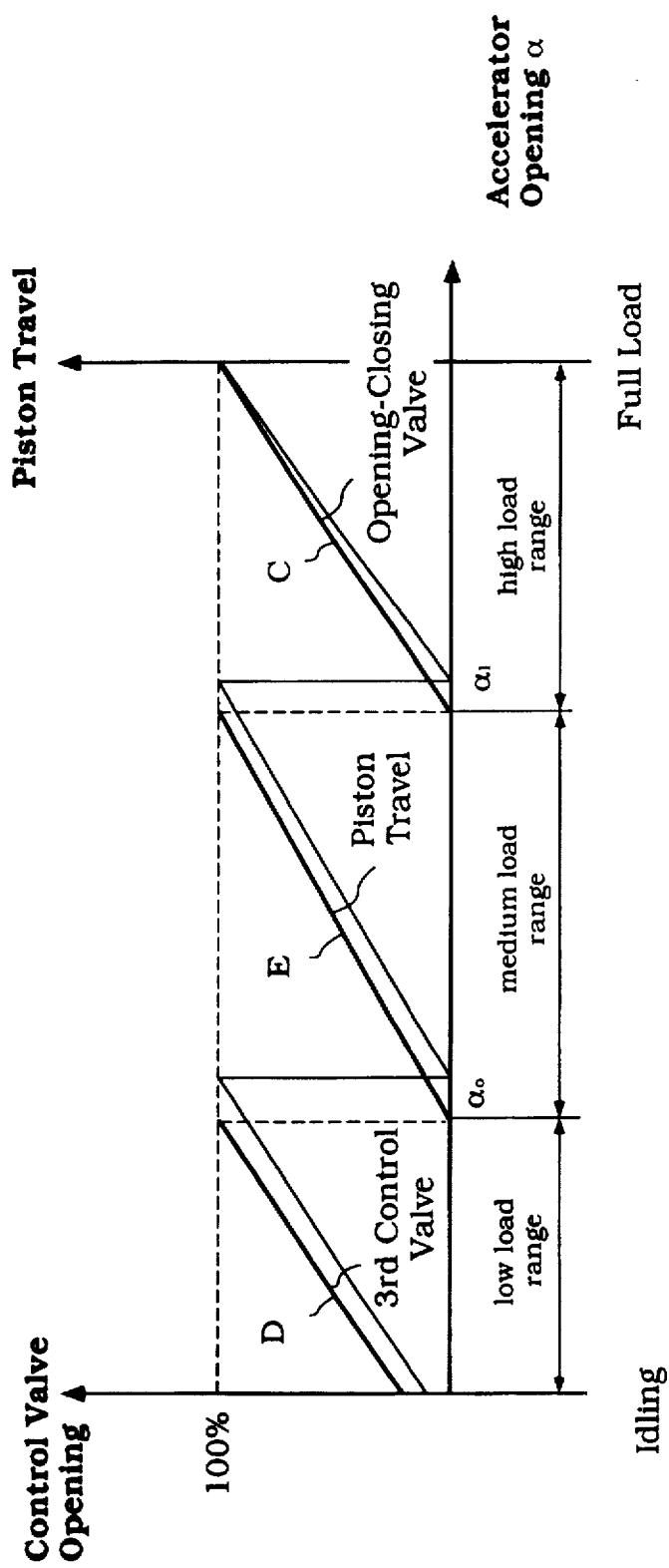
FIG. 15 is a graphical map showing the control arrangement for the valves of the embodiment of FIG. 14 and for a later embodiment.

Another embodiment of an internal combustion engine constructed in accordance with the invention is shown in FIG. 14 with its control strategy being shown in FIG. 15. This engine is identified generally by the reference numeral 231 and has a construction generally the same as the embodiment of FIGS. 5-9. For that reason, where the components of this embodiment are the same or substantially the same as that embodiment, they are indicated by the same reference numerals and will be described again only where necessary to understand the construction and operation of this embodiment.

In this embodiment, the variable volume of the intake passage 79 is accomplished by providing a separate variable volume chamber device, indicated generally by the reference numeral 232. This device 232 is comprised of an outer housing 233 which defines an internal bore 234 in which a piston 235 is supported for reciprocation. The lower end of the bore 234 forms a communicating passageway 236 which has a smaller diameter than the bore 234 and which intersects the induction passage 79 upstream of the communicating passage 76 with the second intake passage 64.

An actuator rod 237 is connected to the piston 235 and is movable in a direction indicated by the arrow 238 so as to vary the effective volume of the chamber 79 by withdrawing or extending the piston 235. The rod 237 is connected to the accelerator mechanism in any suitable manner so that the piston 235 will be actuated in response to movement of the accelerator.

An opening/closing control valve, indicated by the reference numeral 239, is provided in the passage 79 upstream of the passage 236 that communicates the variable volume chamber device 232 with this passage. The valve 239, when opened, permits the first intake passage 79 to communicate directly with the plenum chamber volume 82.

FIG. 15 shows the control strategy for operating the third control valve 89, the piston 235 and the opening/closing control valve 239. Under low speed low load conditions, the piston 235 is maintained at its minimum volume condition and the initial depression of the accelerator pedal causes the third control valve 89 to be moved from its fully closed position to its fully opened position. The fully opened position is at the point $\alpha_0$. From this point forward, the volume of the passageway 79, and specifically the volume V, is varied by moving the piston 235 from its minimum volume condition toward its maximum volume condition. FIG. 14 shows the initial movement in this direction.

At the accelerator opening $\alpha 1$, the piston 235 will be at its maximum volume condition and, thereafter, the opening/closing valve 239 is progressively opened. Thus, this arrangement has exactly the same advantages of those embodiments already described.

Figure 16:
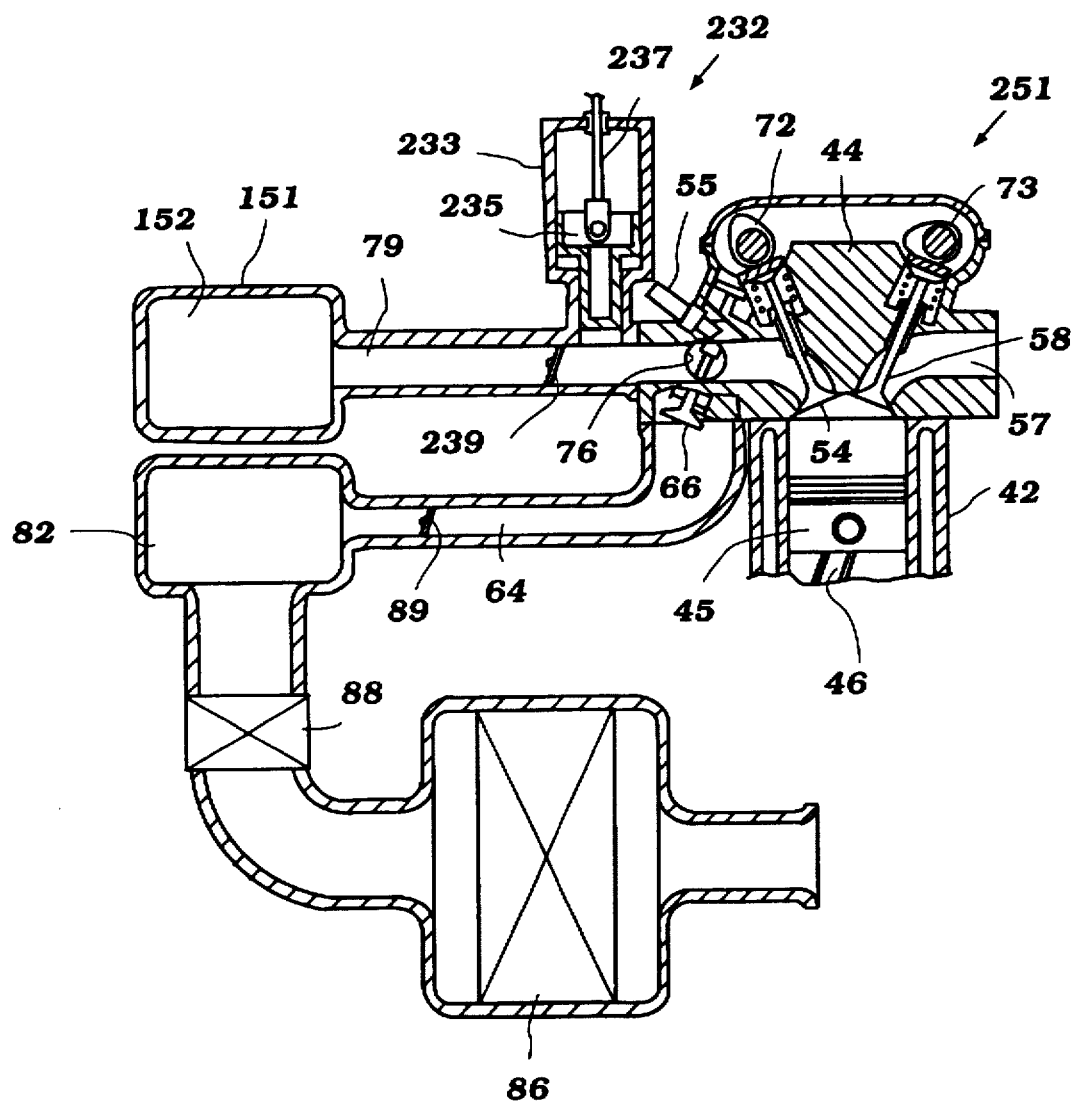
FIG. 16 is a partial cross-sectional view, in part similar to FIGS. 5, 10, 11, 13 and 14, and shows a still further embodiment of the invention.

FIG. 16 illustrates yet another embodiment of the invention which is basically similar to the embodiment of FIG. 14 and, therefore, components of this embodiment which are the same as that earlier embodiment have been identified by the same reference numerals and will not be described again.

The engine in this embodiment is indicated generally by the reference numeral 251 and, unlike the embodiment of FIG. 14, the first intake passage 79 does not communicate with the plenum chamber volume 82 in parallel relationship with the second intake passage 64. Rather, this embodiment provides a separate closed volume chamber which functions like the embodiments of FIGS. 10 and 13. This chamber is, therefore, indicated by the same reference numerals and consists of the volume 152 which serves each cylinder of the engine and which is defined by an outer housing 151. Because this embodiment is similar to those already described, it is believed that a further description of this embodiment is not necessary to permit those skilled in the art to understand the construction and operation of this embodiment. This embodiment also provides a ram supercharging effect like those of FIGS. 10 and 13.

Figure 17:
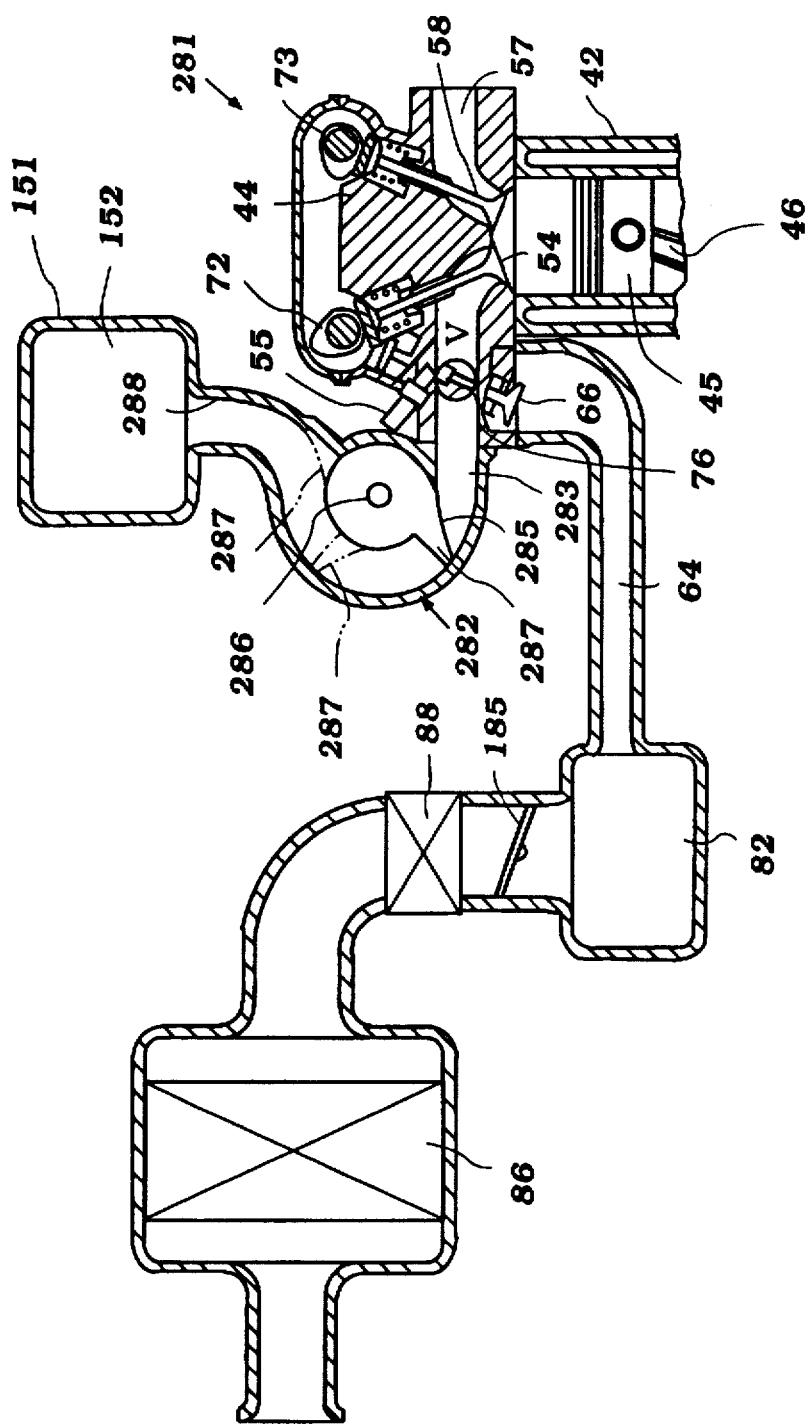
FIG. 17 is a partial cross-sectional view, in part similar to FIGS. 5, 10, 11, 13, 14 and 16, and shows a further embodiment of the invention.
Figure 18:
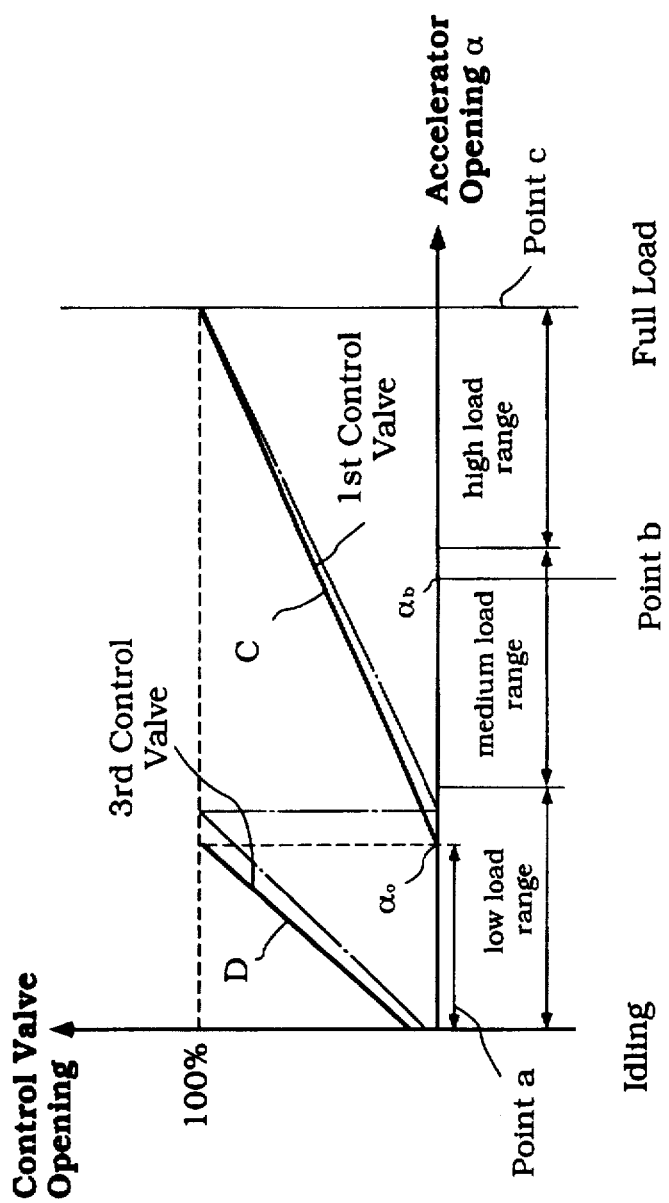
FIG. 18 is a graphical view showing the control map for the embodiment of FIG. 17.

An engine constructed in accordance with another embodiment of the invention is indicated generally by the reference numeral 281 in FIG. 17, and is controlled in accordance with a control routine as shown in FIG. 18. This embodiment is basically the same as the embodiment of FIG. 16, except for the way in which the volume of the first intake passage 79 by its first control valve is varied. For that reason, components of this embodiment which are the same as the embodiment of FIG. 16 have been identified by the same reference numerals and will not be described again, except insofar as is necessary to understand the construction and operation of this embodiment.

In this embodiment, a variable volume chamber device, indicated generally by the reference numeral 282, is attached to the cylinder head 44 in communication with the passageway 79 through a throat section 283. Downstream of this throat section, the device 283 is provided with a generally cylindrical chamber 284 in which a rotating vane device 285 (first control valve) is journalled on a shaft 286. The vane device 285 has a vane 287 which is complementary in shape to the cavity 284 and which, upon rotation therein, moves from a minimum volume position in which it substantially closes the passageway 283 to further positions, as shown in solid and phantom lines in this figure, wherein the volume of the device 282 can be varied. In addition, in its fully opened position, the vain 287 moves out of the chamber 284 and permits communication with the plenum chamber 152 which links all cylinders of the engine 287 through respective passageways 288.

As shown in FIG. 18, the vane device 287 is held in its minimum volume condition until the third control valve is moved from its closed position to its fully opened position. In this particular embodiment, the third control valve is positioned in the communication passageway with the air inlet device 84 upstream of the plenum chamber 82 and thus uses a single control valve 185, as in the embodiment of FIG. 11. Hence, the operation of this embodiment is substantially the same as those previously described and further description of it is not believed to be necessary to permit those skilled in the art to understand and practice the invention.

Figure 19:
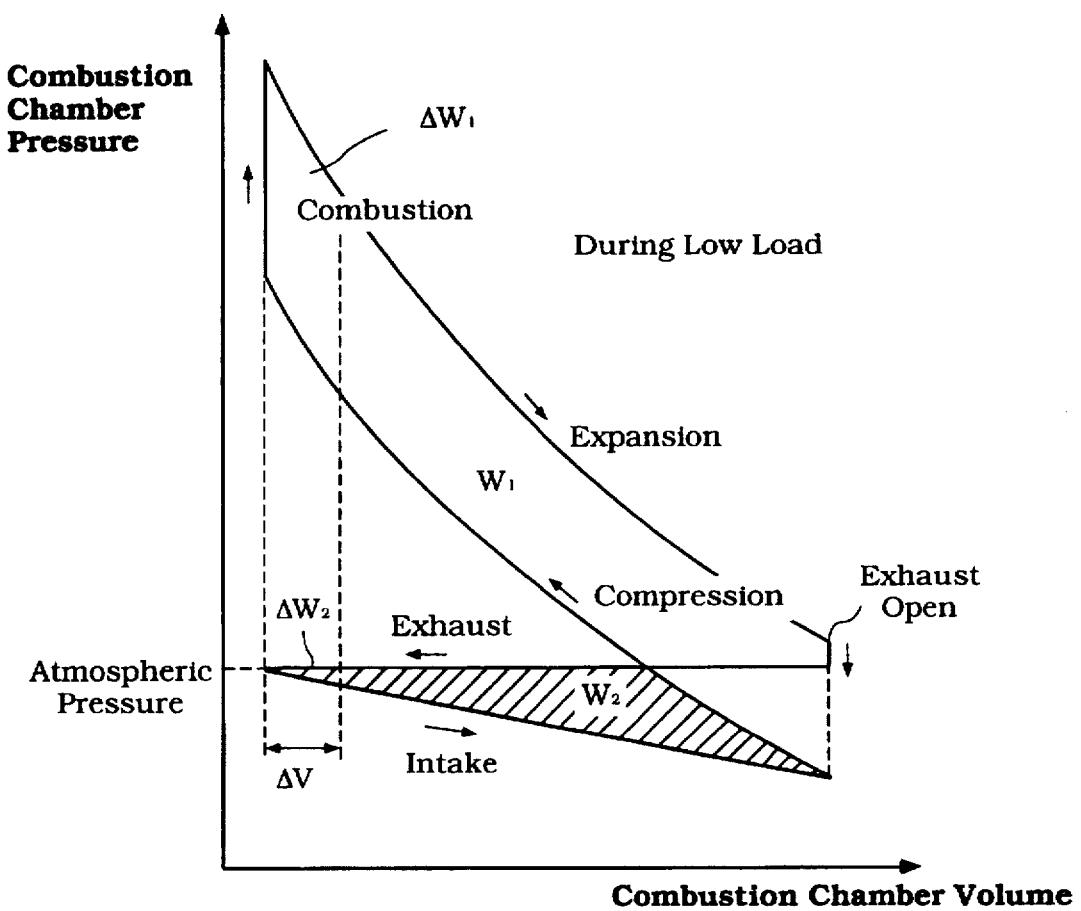
FIG. 19 is a graphical view of the pressure indicator curve and shows how the utilization of a variable compression ratio with any of the embodiments disclosed herein can be employed to further improve thermal efficiency.
Figure 20:
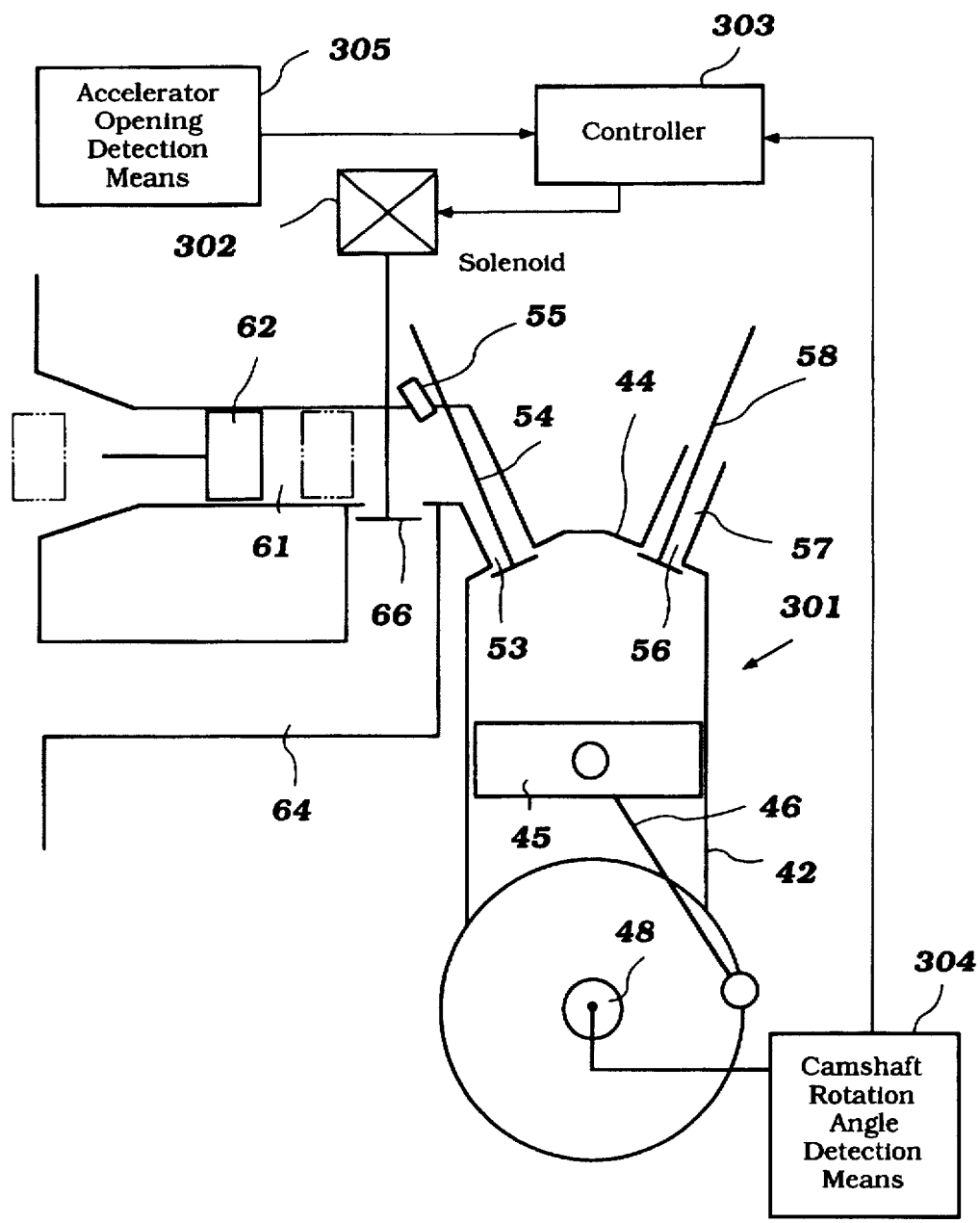
FIG. 20 is a partially schematic cross-sectional view, in part similar to FIG. 2 and shows in more detail how the various systems can be controlled in response to engine running conditions.

From the description of the embodiments as thus far detailed, it should be readily apparent that pumping losses are substantially reduced, particularly at low speed and low load conditions, and idling can be improved with large valve overlaps to permit high power outputs. Further advantages can be employed if a variable compression ratio feature is combined with the various induction systems which have been described. FIG. 19 is a pressure indicator diagram showing how by varying the compression ratio in the range $\Delta V$, further pumping loses, indicated at $\Delta W2$, may be increased, but the total work W1 is increased by the amount $\Delta W1$. Thus, the overall effect of changing the compression ratio causes an increase in the thermal efficiency and fuel economy also to increase.

In all of the embodiments thus far described, the second control valve 66 which controls the communication of the second induction passage 64 with the first passage induction passage (61 in FIG. 2 and 79 in the remaining figures) has been operated by the same camshaft which operates the engine intake valves 54. This provides the advantage of simplicity, but also means that the timing of the opening and closing of the second control valve 66 will not be variable unless a variable valve timing mechanism is interposed in its actuating system.

FIGS. 20–23 show another embodiment of the invention, wherein this second control valve 66 is operated by a separate device which can be controlled independently of the camshaft which operates the engine intake valves 54. The engine in this embodiment is indicated generally by the reference numeral 301 and is shown schematically in a view similar to that of FIG. 2. Because this embodiment is, except for the aforenoted difference, the same as the embodiment of FIG. 2, components of this embodiment which are the same have been identified by the same reference numerals and will not be described again.

With this embodiment, an electrically operated solenoid 302 has its armature connected to the second control valve 66 so as to be capable of opening and closing it. The actual structure for accomplishing this can be of any known type.

The solenoid 302 is controlled by a controller 303 or ECU which receives a number of signals indicative of the running condition of the engine, atmospheric conditions, or the like. These include a signal indicative of the rotational position of the crankshaft 48 which is determined by a crank position sensor 304 which also may be of any known condition. Also, a throttle position sensor 305 provides a signal to the controller indicative of the position of the operator controlled throttle. In addition, a pressure sensor may be provided in the first induction passage 61 downstream of the control piston 62 for sensing the pressure in this conduit.

Figure 22:
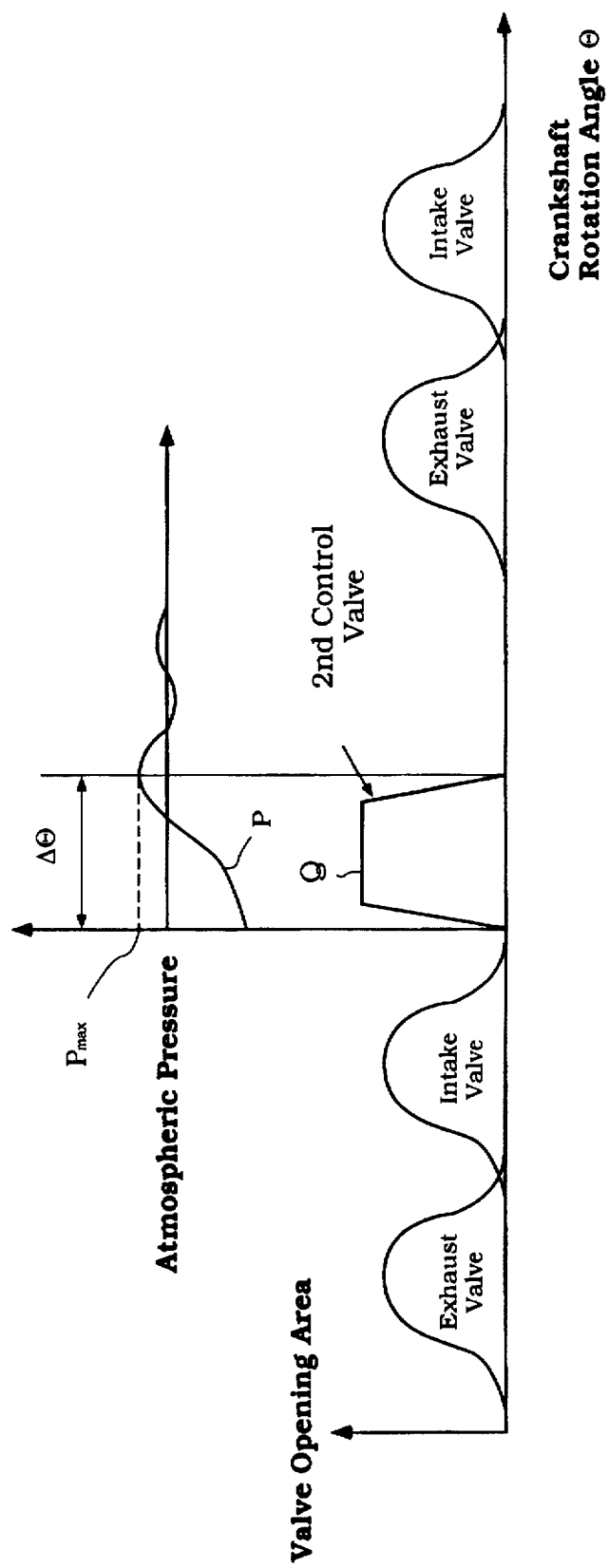
FIG. 22 is a graphical view showing the conditions of the intake and exhaust valves and second control valve during engine running in accordance with this of the invention and illustrates how the pressure in the induction system can be controlled with this embodiment.

FIG. 22 is a timing diagram showing the opening of the intake valves 54 and exhaust valves 58 in relation to the angle of the crankshaft 48. As may be seen, the control valve 66 is opened by energizing the solenoid 305 and its opening follows the curve G in FIG. 22. As may be seen, when the valve 66 is initially opened, the pressure in the intake passage 61 will be less than atmospheric because of the previous intake cycle. However, after the valve 66 is opened, the pressure will rise, as shown in the curve P. The system is designed to maintain the valve 66 opened until the pressure goes to a maximum pressure $P_{MAX}$, which is slightly greater than atmospheric due to the ram effect. The valve 66 is then closed by deactivating the solenoid 302. It should be noted that there is a total opening of time $\Delta \theta$, but there is a delay in full opening and closing of the valve 66 because of inertial effects.

Figure 21:
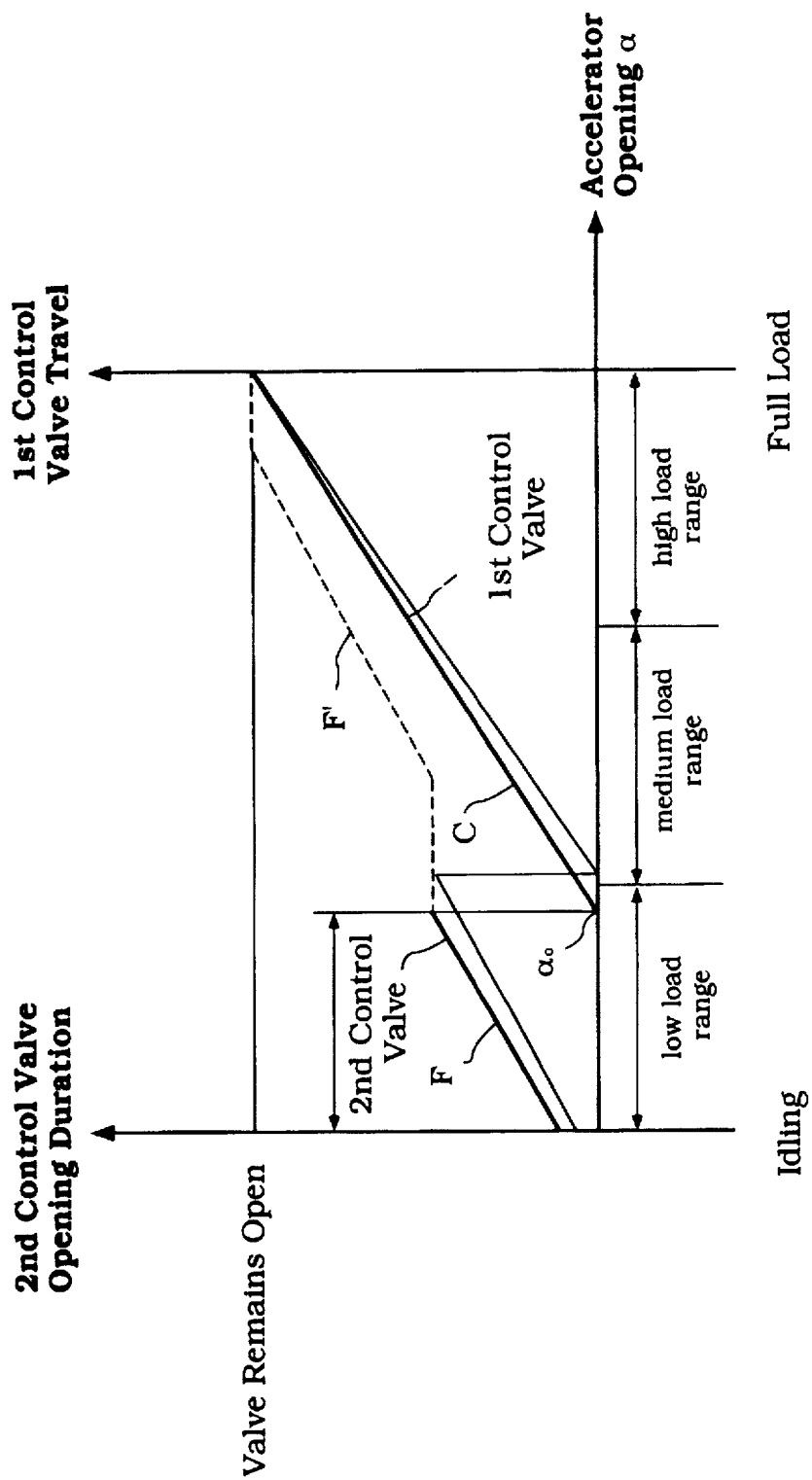
FIG. 21 is a control map for this embodiment of the invention.

FIG. 21 shows the actual control range. During initial opening of the throttle and up until the throttle opening $\alpha_0$, the duration of opening of the valve 66 is increased along the solid line curve F. During this time, the first control piston 62 is not moved and is maintained in the position A. The control valve 62 is then opened along the curve C, being fully opened at the high load range and before the accelerator pedal is fully opened. During this time period, the control valve 66 may be maintained open during the fixed duration, as shown by the broker line curve, or may thereafter continue to be open for longer durations until it is maintained fully opened at the high load range. The actual choice of these curves can depend upon actual engine configurations and the desired performance.

Figure 23:
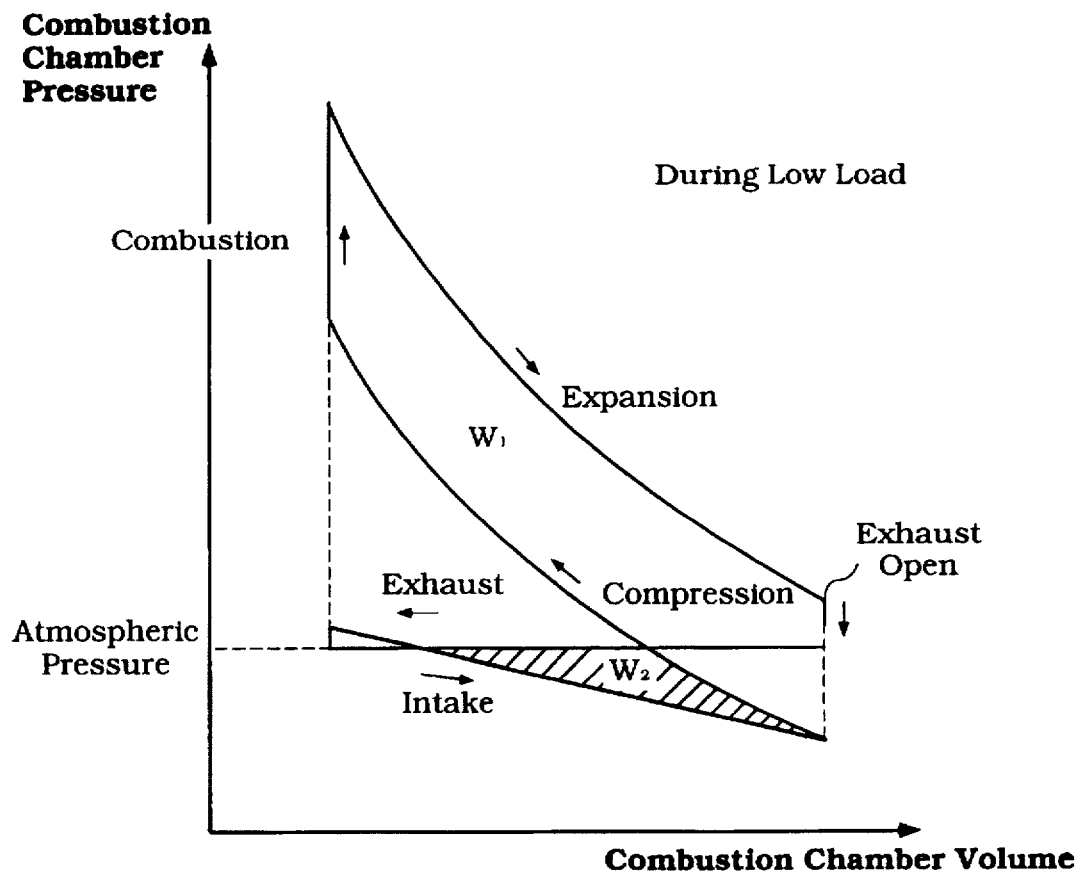
FIG. 23 is a pressure time curve showing how this embodiment further improves induction efficiency and reduces pumping losses.

As shown in FIG. 23, because of the fact that it is possible to maintain greater than atmospheric pressure in the passage 61 when the intake valve 54 initially opens, the pumping losses $W_2$ are reduced even more than with the previously described embodiments. In addition, all of the other advantages previously noted can be achieved with this embodiment.

Figure 24:
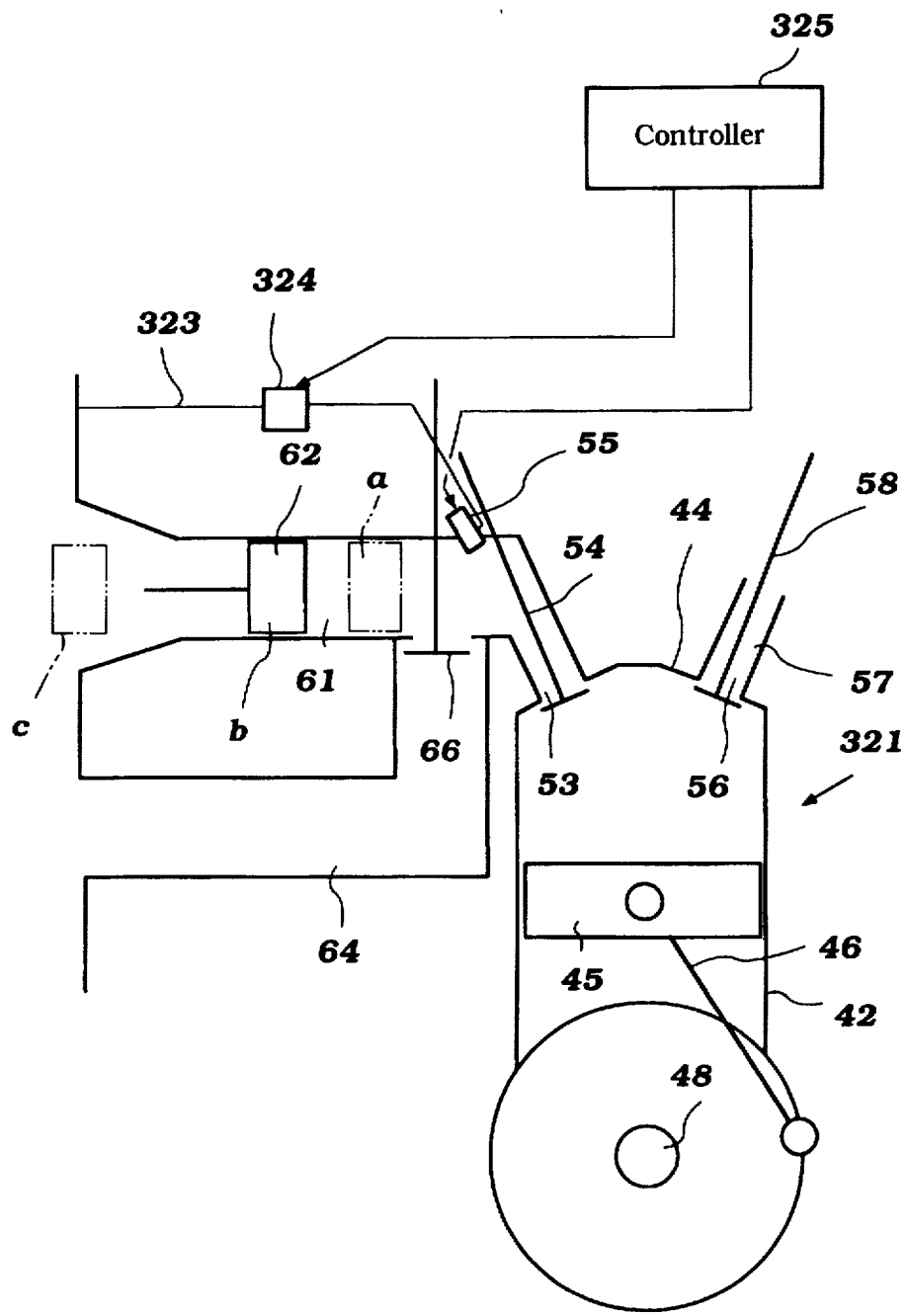
FIG. 24 is a partially schematic cross-sectional view in part similar to FIGS. 2 and 20, and shows how the invention may also be employed with an air assist for the fuel injection system.
Figure 25:
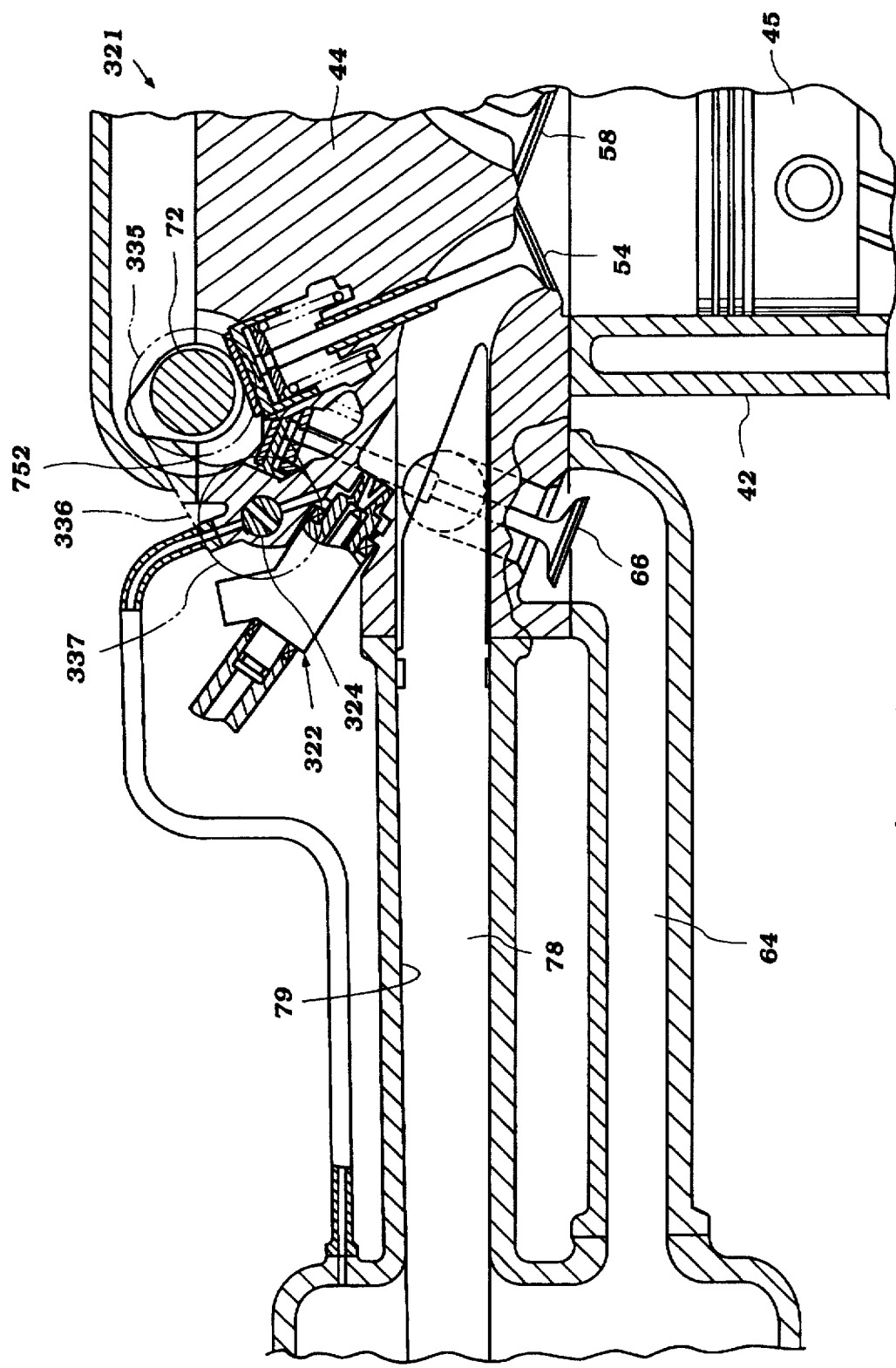
FIG. 25 is an enlarged, true cross-sectional view, in part similar to FIG. 5 but on a larger scale, taken along a plane parallel to that of FIG. 24, and shows the control arrangement for the air assist system.
Figure 26:
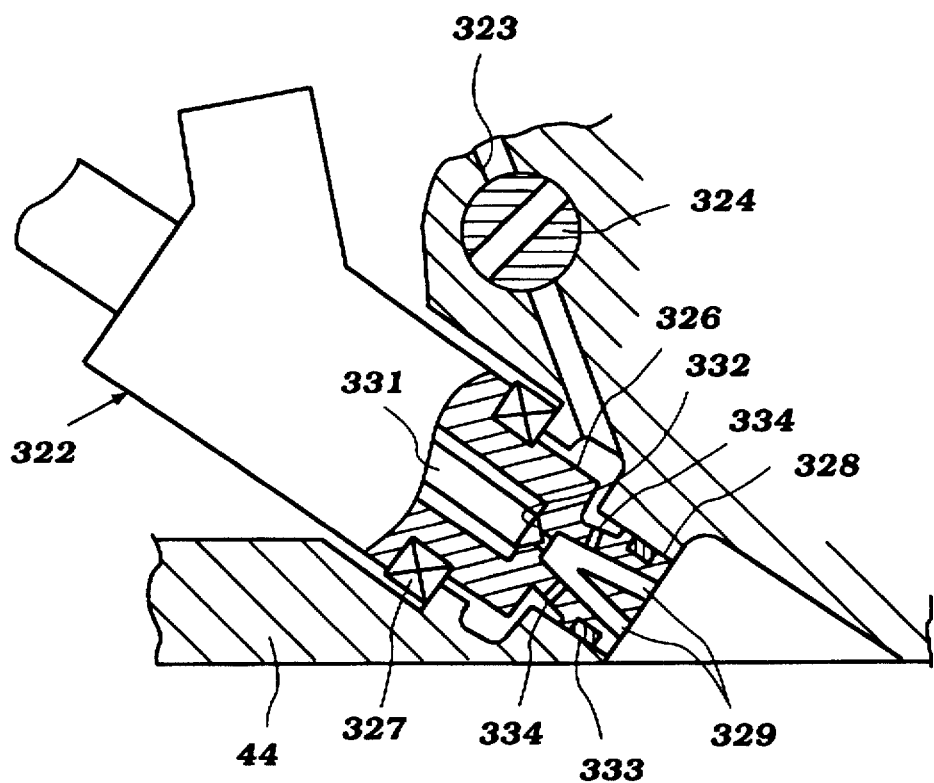
FIG. 26 is an even further enlarged cross-sectional view taken along the same plane as FIG. 25 that shows the details of the fuel injector, air assist system and control valve therefor.

In the embodiments of the invention as thus far described, a fuel injector has been employed as the charge forming device for the engine. The invention may be utilized with other types of charge formers, and FIGS. 24–29 show embodiments similar to that of FIGS. 2 and 3–5 embodying a different type of charge forming system which provides further advantages. FIG. 24 is a schematic view, while FIGS. 25 and 26 are actual engineering drawings that show in more detail the construction. The basic induction system is the same as that of FIGS. 2 and 3–5 and, for that reason, those components which are the same have been identified by the same reference numerals and will be described again only insofar as is necessary to understand the construction and operation of this embodiment.

The engine constructed in accordance with this embodiment is identified generally by the reference numeral 321 and has a fuel injector which is of the air-assisted type and which is identified generally by the reference numeral 322. This injector injects into the respective first intake passage 79 in which the sliding piston valve element 78 is positioned. The location of the injector is the same as that of the previously described embodiments. However, in addition to injecting fuel, the injector 322 also employs air assist through a conduit 323 which functions as an additional induction passage at least under certain running conditions.

An air flow control valve 324 is positioned in the conduit 323 and is controlled by a controller or ECU 325. The controller 325 receives a number of input signals indicative of engine and ambient conditions, some of which will be described. The controller 325 controls the air control valve 324 and also the fuel injector portion of the fuel injector 322.

The actual physical construction of the injector assembly 322 may be best understood by reference to the detailed engineering drawings of FIGS. 25 and 26. In these figures, the air control valve 324 is also depicted, and is depicted as being driven by the intake camshaft 72, although other driving methods will be described later.

The fuel injector 322 is depicted as being of the electrically operated type, and it includes an outer housing 326 which is mounted in a suitable opening formed in the cylinder head 44 and is sealingly engaged by a first seal 327. The injector body 326 has a nozzle tip 328 having a pair of angularly disposed flow openings 329. A pintle-type valve 331 controls the opening and closing of an injector valve seat 332 from which the flow openings 329 extend. The pintle valve 331 is electrically operated, and when opened, fuel may pass through the valve seat 322 and be discharged through the nozzle openings 329.

The portion of the cylinder head opening between the seal 327 and a further seal 333 formed around the nozzle tip 328 forms a chamber to which air is delivered at atmospheric pressure through the passage 323 when the air flow control valve 324 is opened. A plurality of drilled passages 334 extend through the nozzle tip 328 to the nozzle jet openings 329.

As has been noted, during at least a portion of the intake cycle when air is flowing into the combustion chamber from the volume V of the first intake passage 79, the pressure will be less than atmospheric. Hence, by delivering atmospheric air to the passage 323 and through the drill passages 334, there will be a large pressure difference which will cause a rapid air flow and will act to assist in atomizing the injected fuel. In addition to this, the air that is injected will supply some of the air required for engine combustion, and hence the size of the volume V may be made slightly smaller and the openings of the various control valves can be changed so as to reflect this effect. This will be described further at a later portion of this specification.

Referring specifically to FIG. 25, it has been mentioned that the valve 324 may be driven in timed relationship from the intake camshaft 72, and such a structure is shown in this figure. A sprocket 335 is affixed to the intake camshaft 72 and drives a timing gear or toothed belt 336 which, in turn, drives a sprocket 337 that is affixed to an end of the control valve shaft 324.

Figure 27:
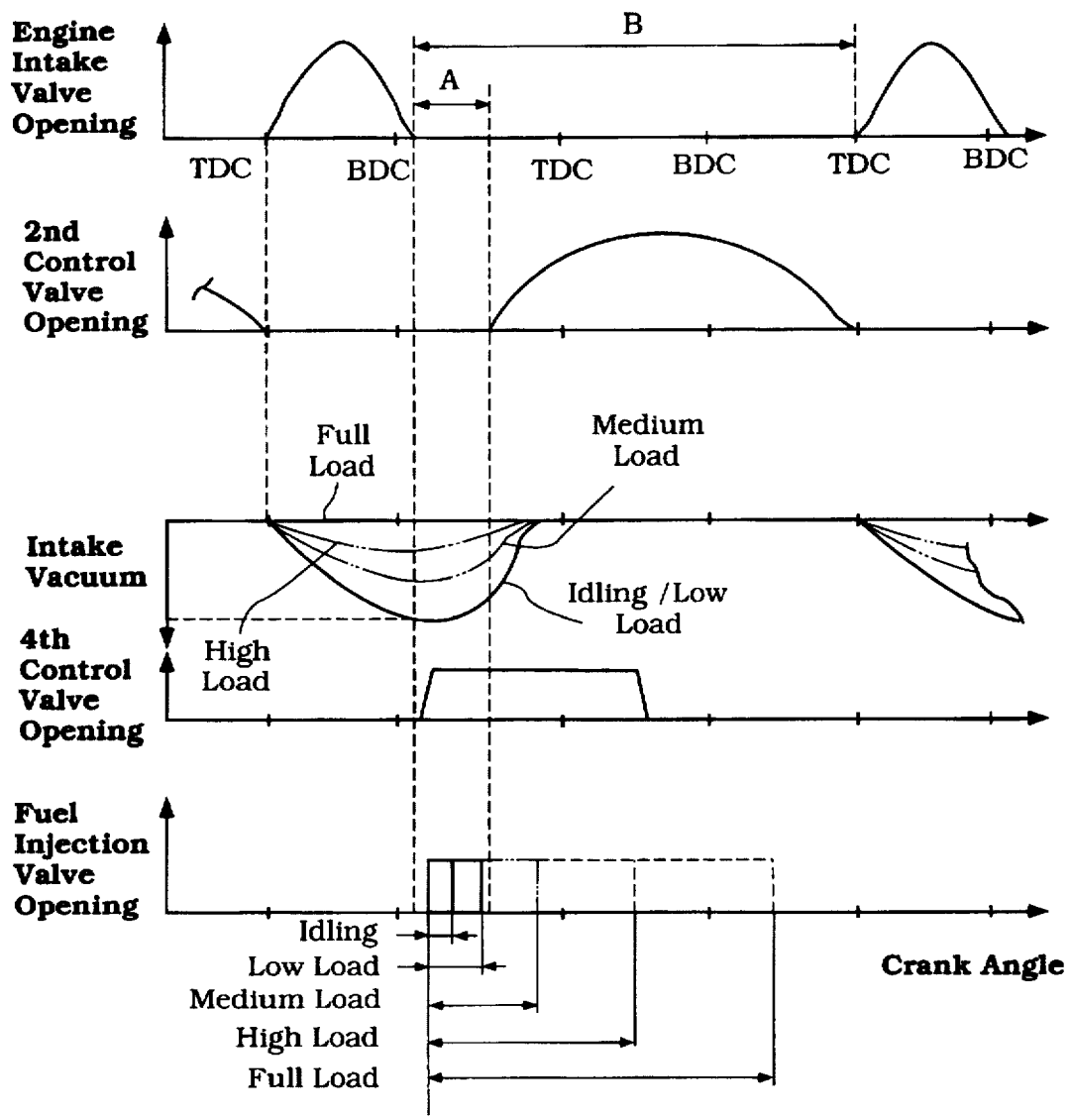
FIG. 27 is a graphical view showing the intake valve events control valve operation, intake manifold vacuum and fuel injection operation in conjunction with the air assist system of this embodiment.

This arrangement can provide a fixed timing of opening and closing of the air control valve 324, and this effect may be understood by reference to FIG. 27, which is a timing diagram that shows the opening conditions of the main engine intake valve 54, the opening of the second intake control valve 66, the pressure in the intake passage 79, the opening of the air (fourth) control valve 324, and the timing of fuel injection when the pintle valve 331 is opened.

As may be seen, when the main engine intake valve 54 is opened during the intake cycle, the pressure in the induction passage 69 begins to decrease. This pressure is at its minimum at the time immediately after the main intake valve is closed, this being indicated by the dotted line in FIG. 27. At this time and prior to the point in time when the second intake control valve 66 opens (indicated by the dimension A in this figure), the air (fourth) control valve 324 is in an open position. Hence, the air will flow through the passage 323 into the injector drilled openings 334 due to the substantial pressure difference. Immediately after this, the pintle valve 331 is opened, with the time of opening being dependent upon the load, as shown in this figure. Hence, the air flowing from the air assist system will impinge with the fuel and cause the fuel to vaporize. In addition, the result of the air pressure causes an adiabatic compression, which further raises the temperature, and hence the evaporation of the fuel so as to enhance thermal efficiency.

Subsequently, the second control valve 66 is opened, and the pressure then in the chamber 69 will decrease, and the amount of air assist will gradually decrease, even though the control valve 324 is still in an open condition.

Figure 28:
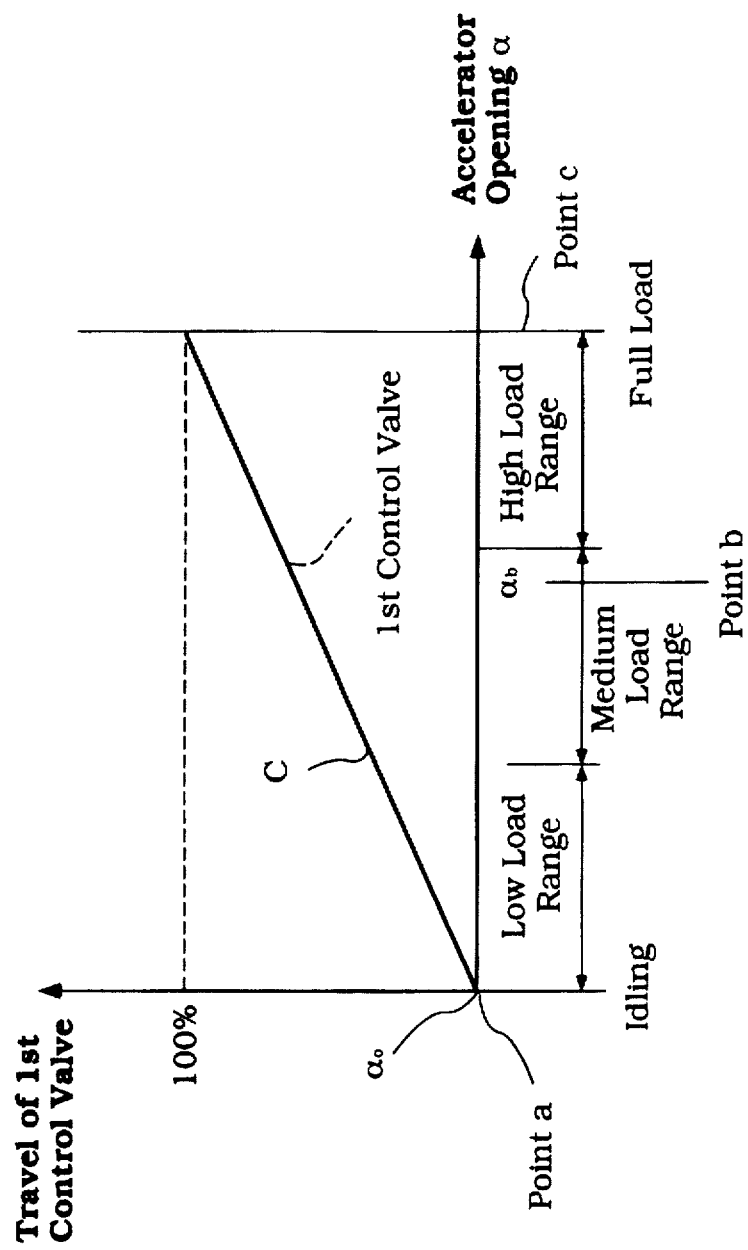
FIG. 28 is a further graphical view showing the control map arrangement for this embodiment.
Figure 29:
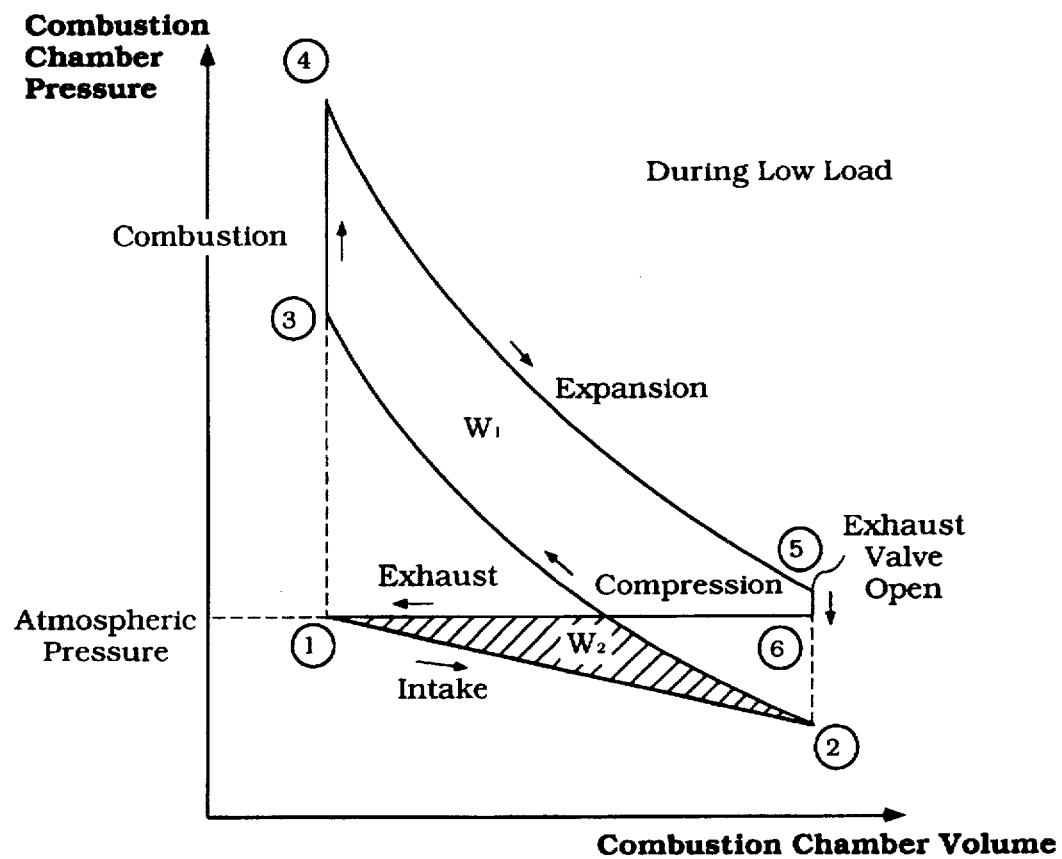
FIG. 29 is a pressure indicator curve showing how this embodiment reduces pumping losses and improves volumetric efficiency.

As a result of this added air flow, the fuel charge which enters the combustion chamber when the intake valve 54 again opens will be well vaporized, and good thermal efficiency will result, in addition to the advantages in minimization of pumping losses as aforenoted. As has been previously noted, the first control valve 78 is also gradually increased in response to the opening of the accelerator pedal, as shown in FIG. 28. Hence, FIG. 29 shows how the pumping losses are reduced and how efficiency of the engine is therefore increased.

As has been noted, although FIGS. 25 and 26 show that the fourth air control valve 324 is mechanically driven from the intake camshaft 72, the timing of its operation can be changed by the ECU 325 either by using a variable valve timing mechanism in the drive or by operating the valve 324 by a solenoid or stepper motor, as described previously in conjunction with the embodiment of FIG. 20.

If this is done, it is also possible to input detected signals such as an engine temperature signal so as to maintain the valve 324 open when the temperature is lower than a preset value and keep it closed when the temperature is greater than a preset value. In this way, the poor fuel atomization at low engine temperatures is avoided, the ease of starting is improved, and the maintenance of low emissions and exhaust constituents under cold start conditions can be improved. Thus, this arrangement has still further advantages over some of the embodiments previously described in which only pure fuel injection is employed.

Figure 30:
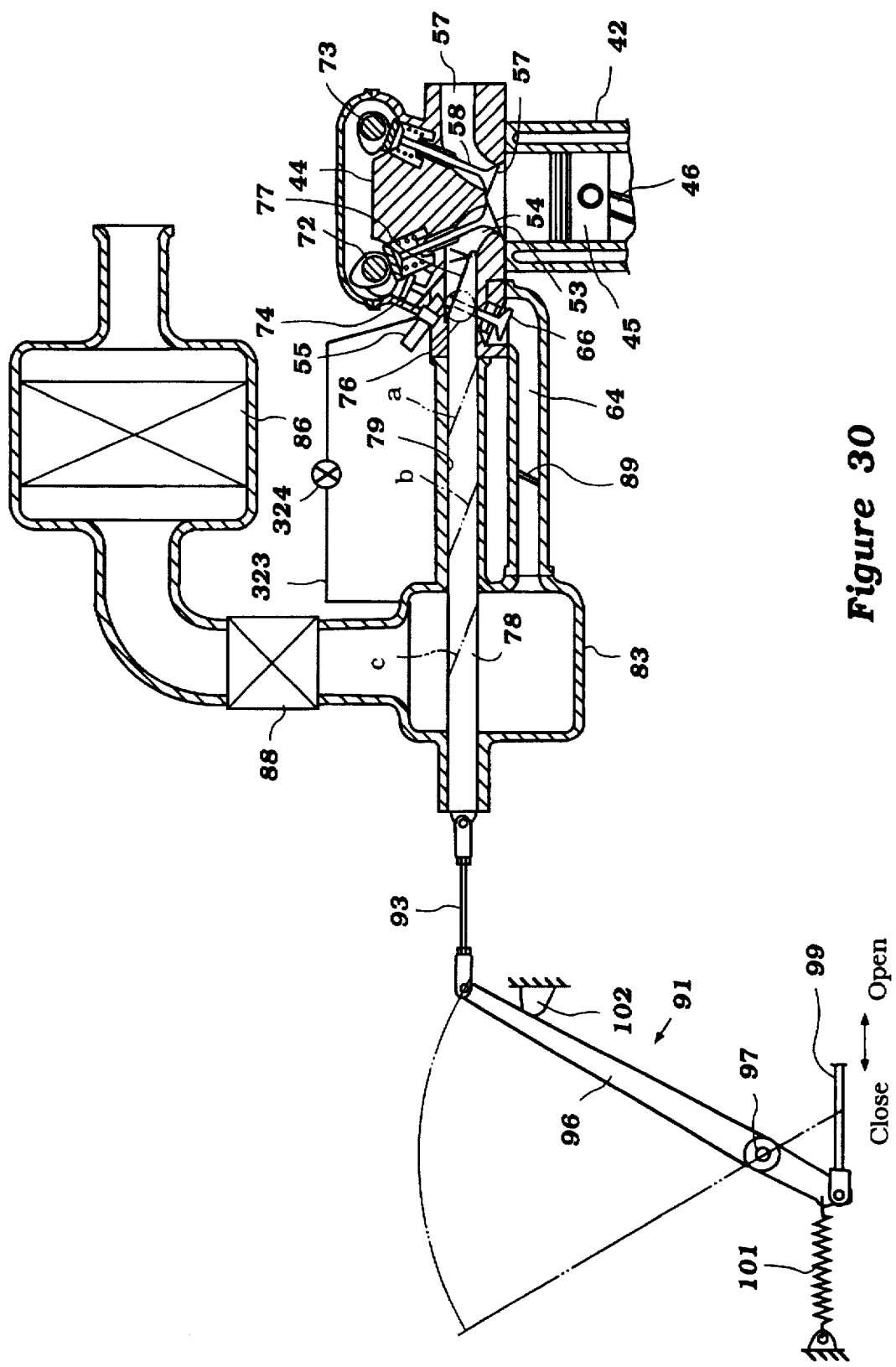
FIG. 30 is a cross-sectional view, in part similar to FIG. 5, and shows how that earlier embodiment may also be used in conjunction with an air-assisted fuel injection system.

The remaining figures show how the air-assisted fuel injection system can be employed with the various embodiments of the invention which have been previously described. For example, FIG. 30 illustrates how the air-assisted fuel injection system can be employed with a system of the type shown in FIG. 5. In this arrangement the air for the air assist is delivered from the plenum chamber 82 downstream of the air flow measuring device 88. Also, since additional air is supplied through the injection system, the rate of opening of the third control valve 89 can be delayed, as shown in the dotted-line view of FIG. 9, and accordingly, the timing of opening of the first control valve 78 and its rate of movement can be altered, as shown by the dot-dash line in FIG. 9. In all other regards, the embodiment is the same as what has already been described, and therefore, further description of this embodiment is not believed to be necessary to permit those skilled in the art to practice the invention.

Figure 31:
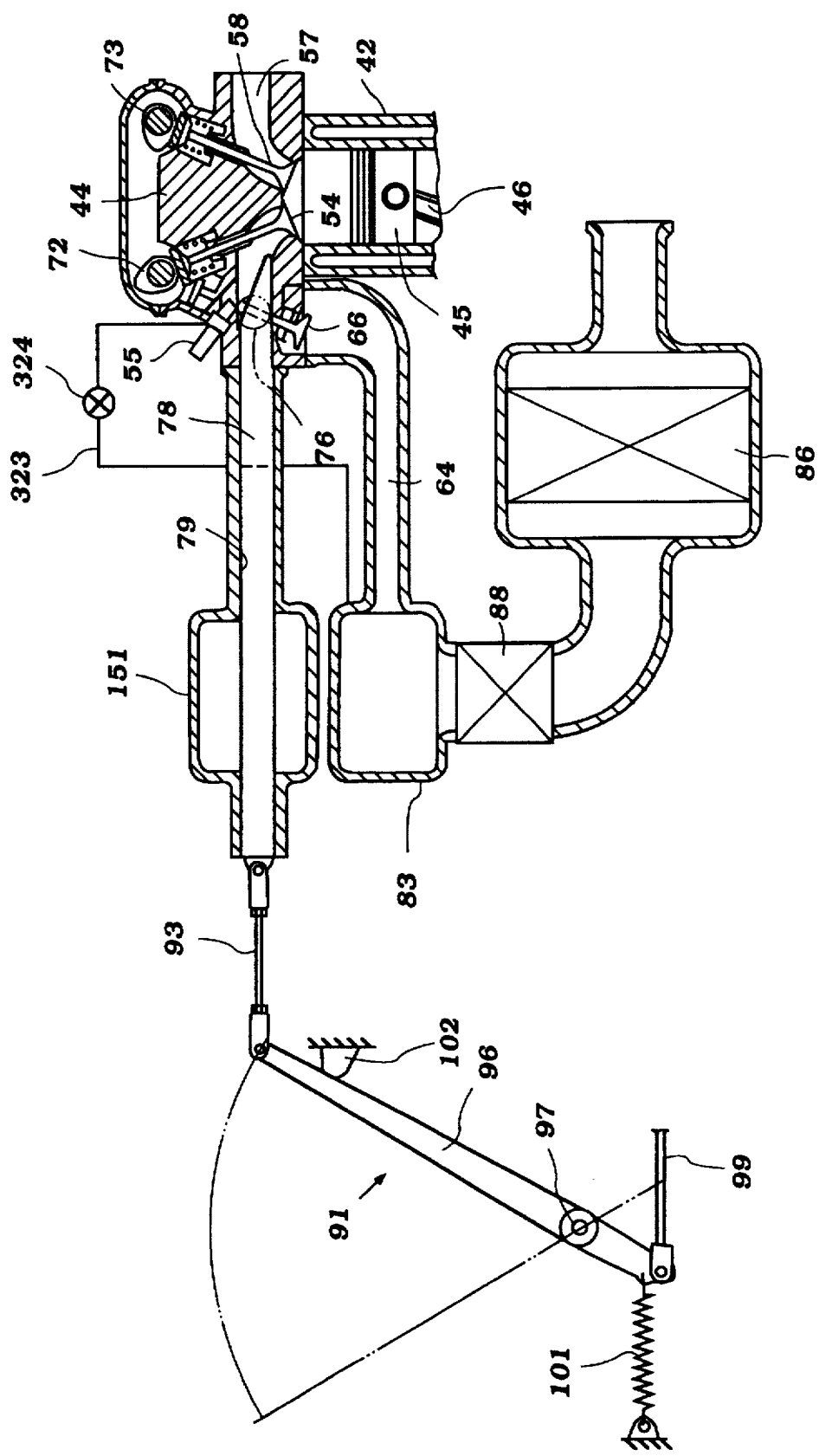
FIG. 31 is a cross-sectional view, in part similar to FIG. 10, and shows how this embodiment may be employed in conjunction with an air-assisted fuel injection system.

FIG. 31 is a view, in part similar to FIG. 10, and shows how the air-assisted fuel injection system may be employed in conjunction with that embodiment. In this embodiment the air for the air assist is drawn through the conduit 323 from the plenum chamber 82, and not the chamber 152 in which the first control valve 79 is positioned.

Figure 32:
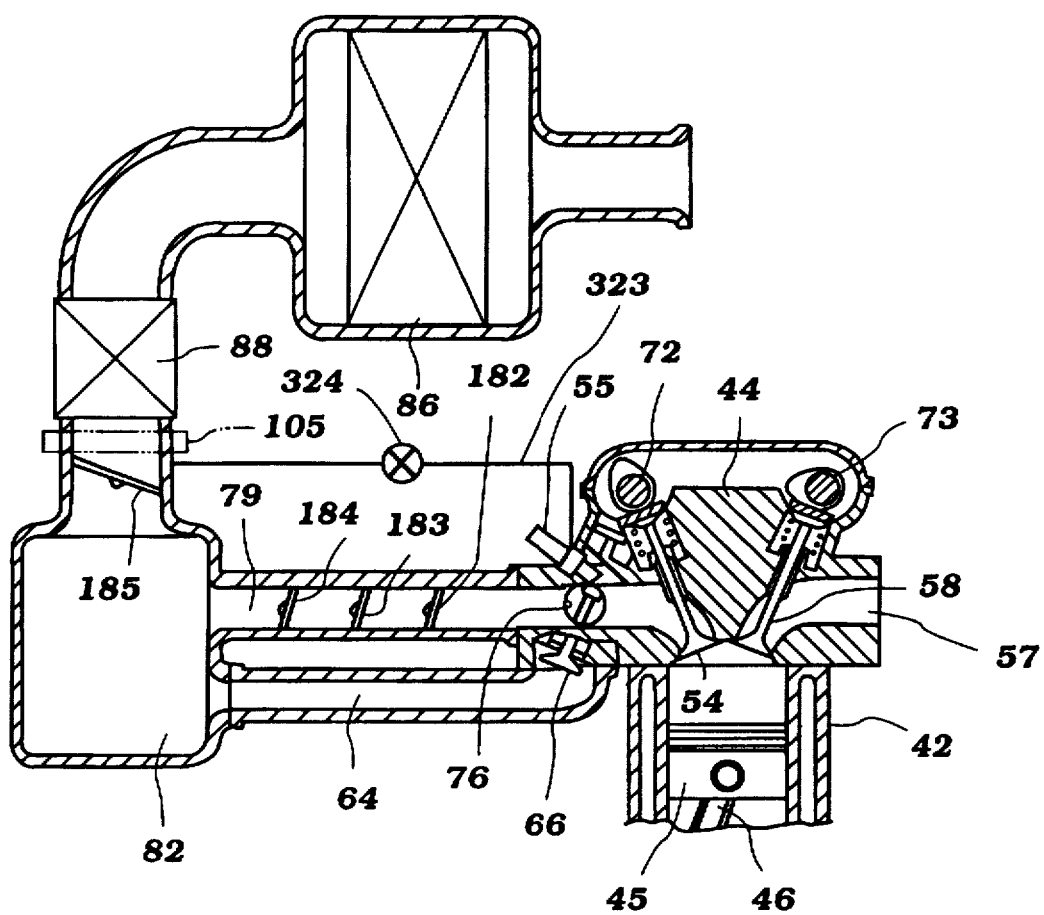
FIG. 32 is a cross-sectional view, in part similar to FIG. 11, but shows how an air-assisted fuel injection system may be employed with this embodiment.

FIG. 32 is a view, in part similar to FIG. 11, and again shows how the air-assisted fuel injection may be employed with such an embodiment. In this embodiment the air assist line 323 is taken from the area immediately downstream of the air flow meter 88 and upstream of the control valve 185. If the engine is supercharged, this air is taken from downstream of the supercharger 105. The dotted line and dot-dash line views of FIG. 12 show the effect of the added air flow on the control valve strategy.

Figure 33:
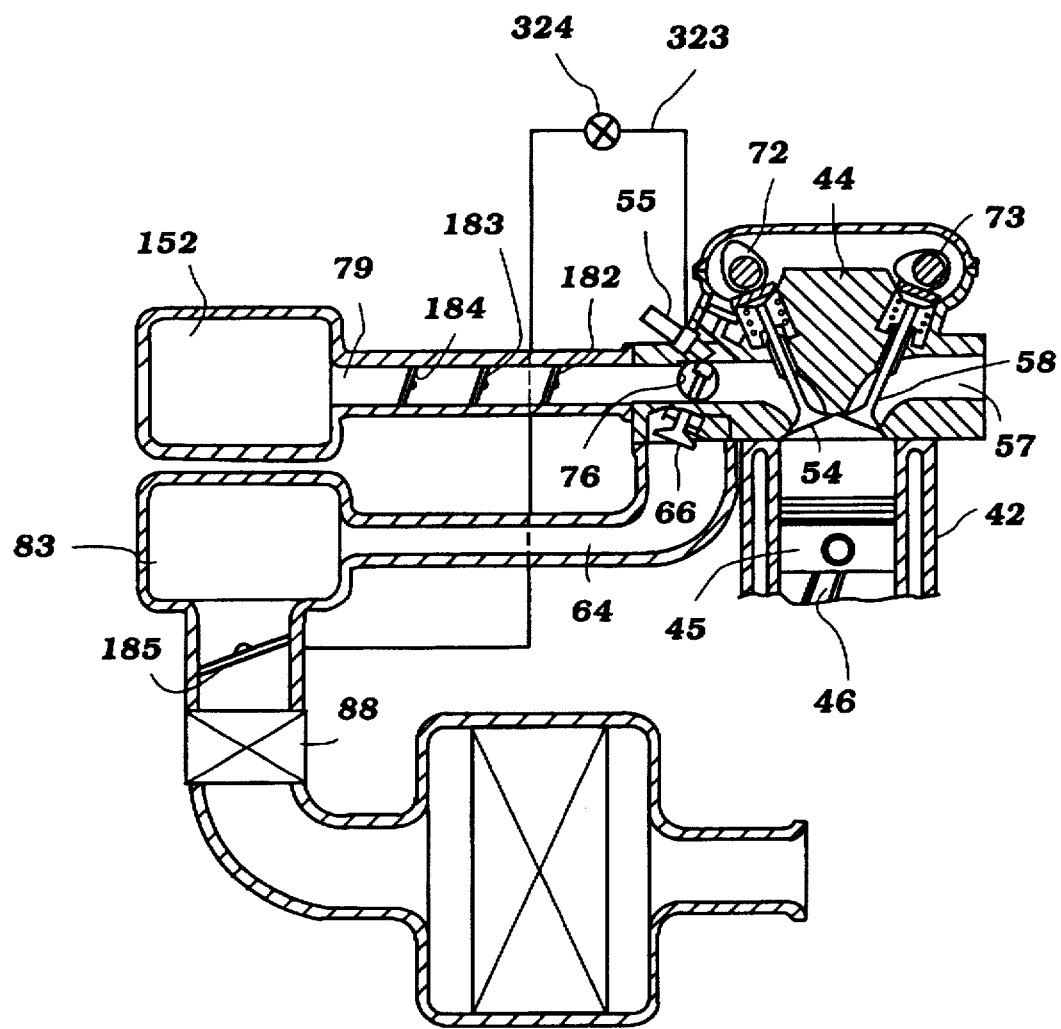
FIG. 33 is a partial cross-sectional view, in part similar to FIG. 13, and shows how an air-assisted fuel injection system may be employed.

FIG. 33 is a view, in part similar to FIG. 13, and shows how the air-assisted fuel injection system can be employed in conjunction with that embodiment. In this case the air for assist is taken from the area between the air flow meter 88 and the third control valve 185. This assures the presence of atmospheric air for the air assist of the fuel injection. Again, it is believed that a further description of this embodiment is not required in view of the foregoing descriptions.

Figure 34:
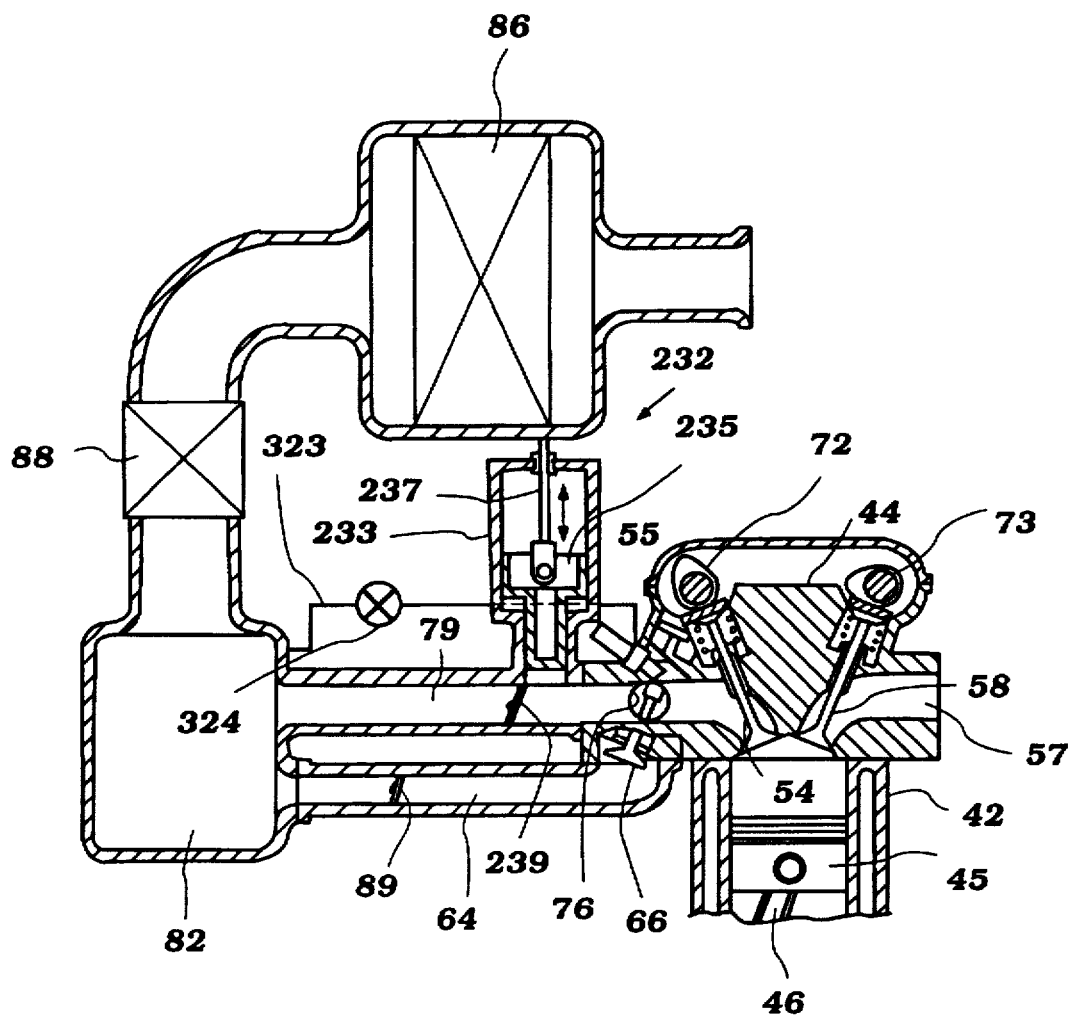
FIG. 34 is a partial cross-sectional view, in part similar to FIG. 14, and shows how an air-assisted fuel injection system can be employed.

FIG. 34 is a view showing how the air-assisted fuel injection may be employed with an induction system of the type shown in FIG. 14. In this arrangement the air for the air assist is taken directly from the plenum chamber 82. Because of this arrangement it is also possible to defer the opening of the third control valve 89 and to open it at a slightly lesser rate. Also, the piston 235 may have its movement delayed, and the opening of the opening/closing valve 239 may also be delayed. This is shown by the dot-dash lines in FIG. 15. Again, this is possible because of the additional air flow provided through the air assist system for the fuel injection.

Figure 35:
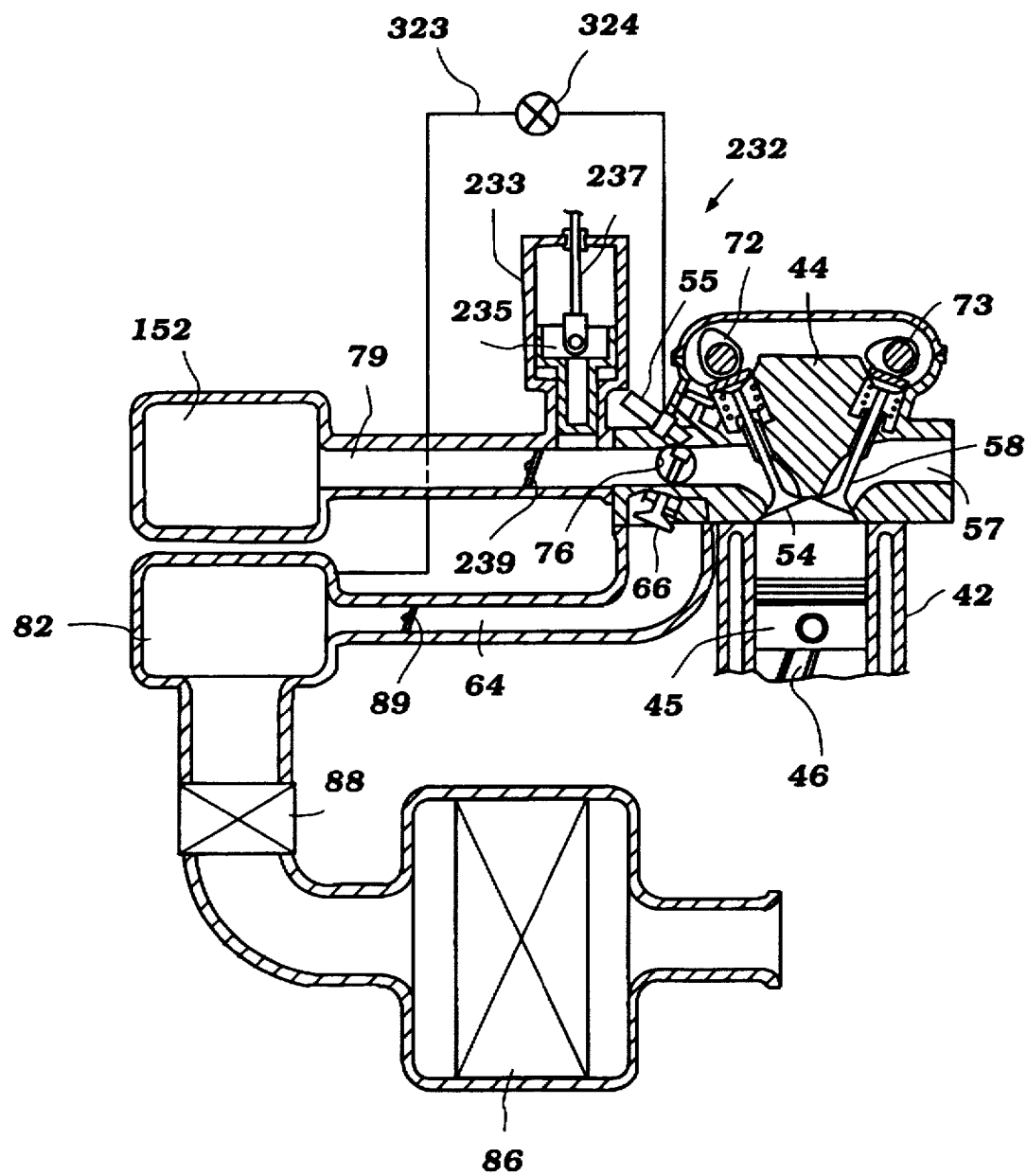
FIG. 35 is a partial cross-sectional view, in part similar to FIG. 16, and again shows how an air-assisted fuel injection system may be employed.

FIG. 35 shows another embodiment which is basically the same as the embodiment of FIG. 16, and for that reason, the reference numerals applied in that figure have also been utilized in this figure. This also shows the use of an air assist system for the fuel injection, and the air assist conduit 323 is connected to the plenum chamber 82 so as to ensure the presence of atmospheric air. Again, further description of this embodiment is not believed to be necessary.

Figure 36:
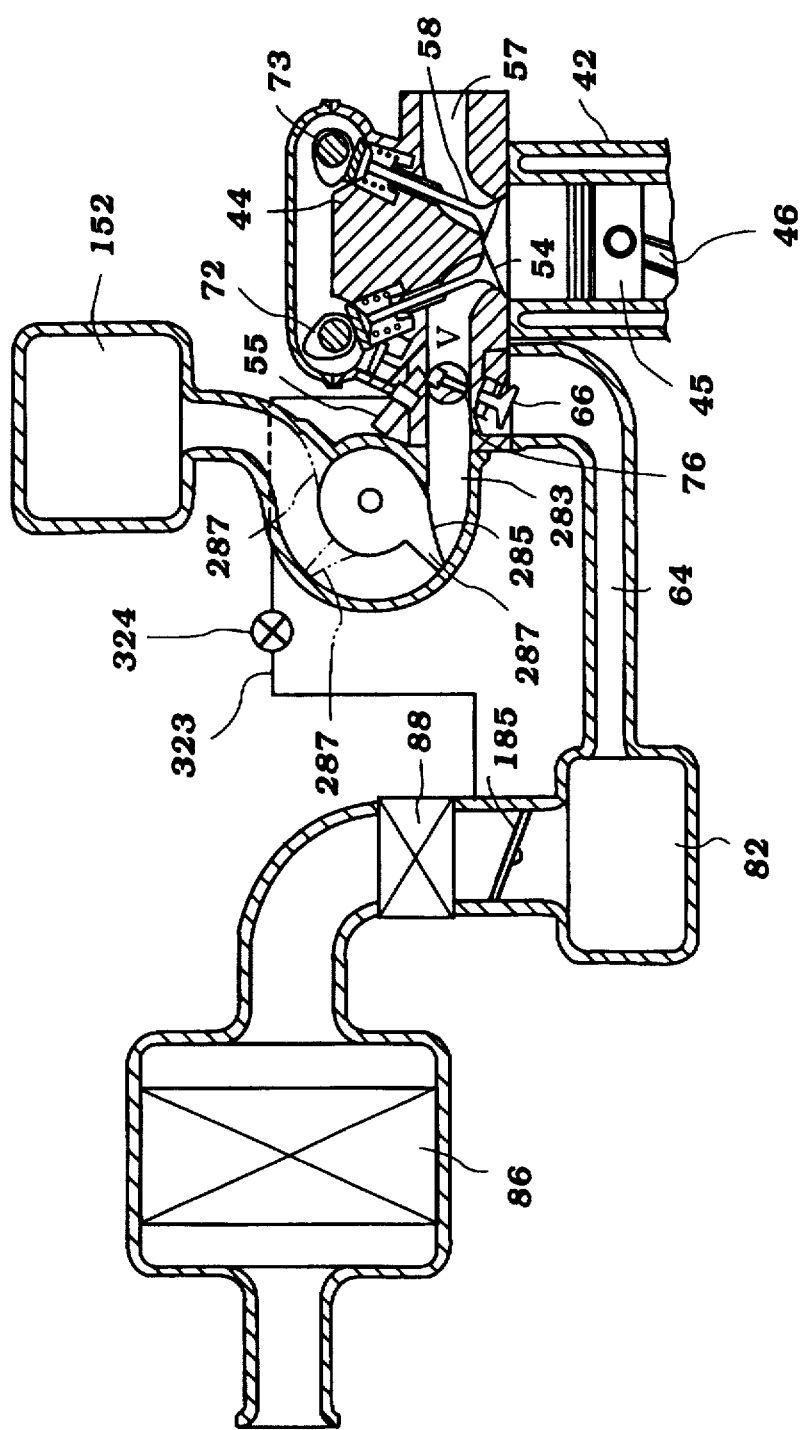
FIG. 36 is a partial cross-sectional view, in part similar to FIG. 17, and shows how an air-assisted fuel injection system may be employed.

FIG. 36 is a view, in part similar to FIG. 17, and shows how the air-assisted fuel injection may be employed with an engine having an induction system of the type shown in FIG. 17. For that reason, components of this embodiment which are the same as that earlier embodiment have been identified by the same reference numerals. In this embodiment the air assist line 323 is taken from the area between the air flow meter 88 and the third control valve 185 so as to ensure that atmospheric air pressure is always available for air assist of the fuel injection.

As with the earlier air-assisted embodiments, the additional air flow provided by the air assist can be utilized to delay both the opening of the third control valve 185 and its rate of movement, as well as the delay in the opening of the variable valve provided by the vane 287, and this is shown by the dot-dash line view of FIG. 18.

Figure 37:
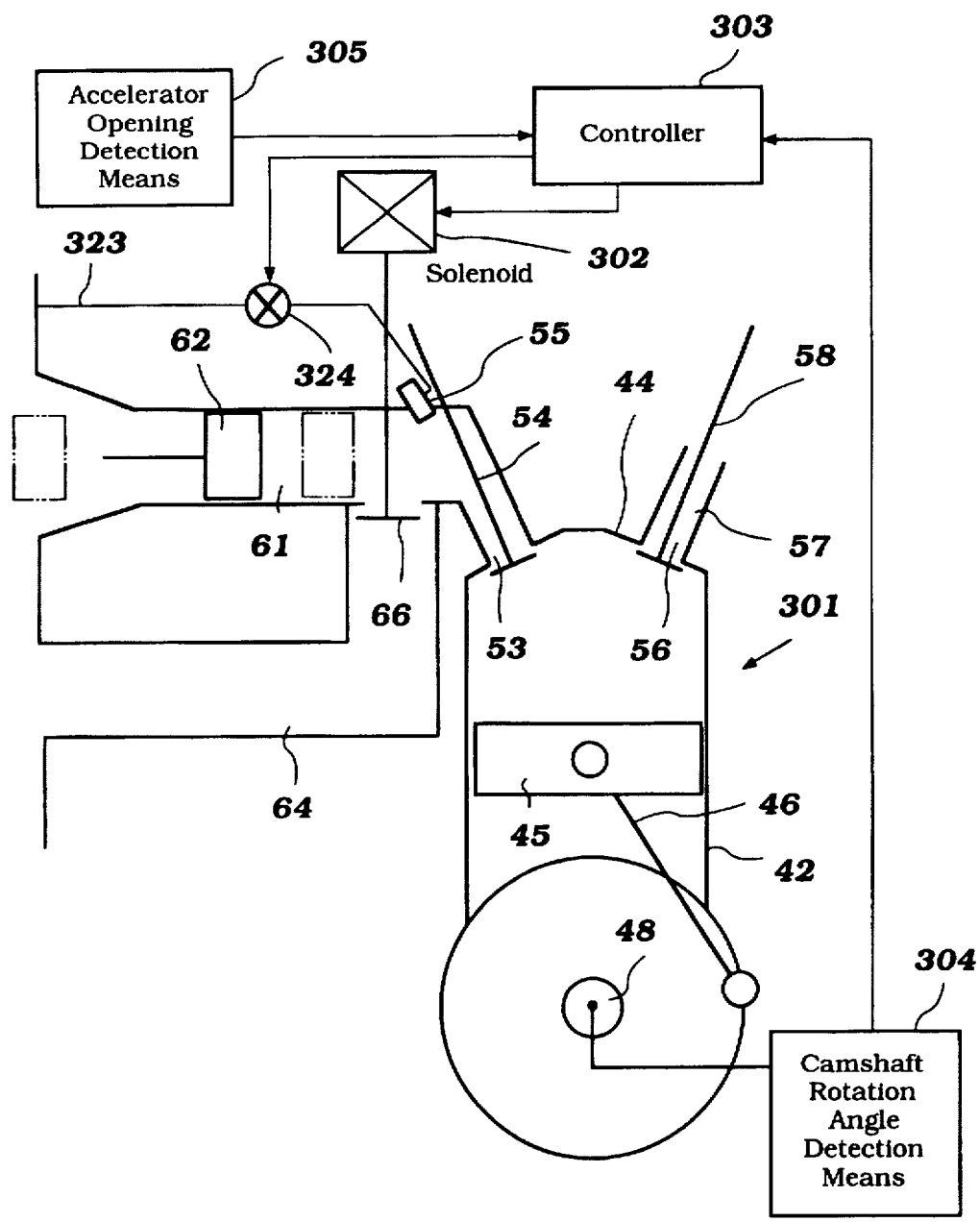
FIG. 37 is a schematic cross-sectional view, in part similar to FIG. 20, and shows how this embodiment may utilize an air-assisted fuel injection system.

FIG. 37 is a view showing how the air-assisted fuel injection may be employed when the second control valve 66 is operated by a solenoid. Hence, a further description of this embodiment is not necessary. However, if the air assist control valve 324 is also electrically controlled rather than being driven by the intake camshaft, then the controller 303 can provide the control for such an arrangement. This is also shown schematically in FIG. 37.

Thus, from the foregoing description it should be readily apparent to those skilled in the art how the described embodiments are effective in improving engine output and fuel economy through the use of an induction system where pumping losses are reduced, thus permitting utilization of a Miller cycle and not having the disadvantages of it. Of course, the various embodiments shown are those preferred forms which the invention can take, but various changes and modifications may be made without departing from the spirit and scope of the invention as defined by the appended claims.

We claim:

1. An induction system for an internal combustion engine having a combustion chamber with a volume that varies cyclicly during a cycle of engine operating, an intake port for admitting an air charge to said combustion chamber, means for cyclicly opening and closing said intake port for controlling the admission of an air charge to said combustion chamber, means defining an air chamber communicating with said intake port for supplying an air charge to said intake port, means for adjusting the effective volume of said air chamber in response to the operator demand and the load on said engine during at least a range of operation of said engine for controlling the volume of air which is supplied to said combustion chamber from said air chamber during a single intake cycle, and control valve means for communicating atmospheric air to said air chamber during the portion of the engine cycle when said intake port is closed.

2. The induction system for an internal combustion engine as set forth in claim 1, wherein there is no throttling of the air delivered to the combustion chamber by the induction system.

3. The induction system for an internal combustion engine as set forth in claim 1, wherein there is provided a first valve for controlling the effective volume of the air chamber and wherein the control valve means comprises a second valve controlling the flow to the air chamber from an atmospheric air inlet.

4. The induction system for an internal combustion engine as set forth in claim 3, wherein the first valve comprises a sliding piston.

5. The induction system for an internal combustion engine as set forth in claim 4, wherein the second valve comprises a valve movable between an opened position and a closed position at a time when the intake port is closed.

6. The induction system for an internal combustion engine as set forth in claim 5, wherein the air chamber is formed by a first intake passage having a branch passage in which the sliding piston is positioned.

7. The induction system for an internal combustion engine as set forth in claim 4, wherein the opening and closing of the second valve is accomplished in timed relationship to the engine cycle.

8. The induction system for an internal combustion engine as set forth in claim 4, wherein the timing of opening and closing of the second control valve is variable for controlling the amount of air admitted to the air chamber.

9. The induction system for an internal combustion engine as set forth in claim 3, further including a fuel injector for injecting fuel into the engine for combustion.

10. An induction system for an internal combustion engine having a combustion chamber with a volume that varies cyclicly during a cycle of engine operating, an intake port for admitting an air charge to said combustion chamber, means for cyclicly opening and closing said intake port for controlling the admission of an air charge to said combustion chamber, means defining an air chamber communicating with said intake port for supplying an air charge to said intake port, means for adjusting the effective volume of said air chamber in response to at least one engine running condition during at least a range of operation of said engine for controlling the volume of air which is supplied to said combustion chamber from said air chamber during a single intake cycle, and control valve means for communicating atmospheric air to said air chamber during the portion of the engine cycle when said intake port is closed, said means for adjusting the effective volume of said air chamber comprising a sliding piston valve movable into a further chamber when in its fully opened position, which further chamber forms an extension of the air chamber only when said sliding piston valve is in its fully opened position.

11. The induction system for an internal combustion engine as set forth in claim 10, further including means for admitting atmospheric air to the further chamber.

12. An induction system for an internal combustion engine having a combustion chamber with a volume that varies cyclicly during a cycle of engine operations, an intake port for admitting an air charge to said combustion chamber, means for cyclicly opening and closing said intake port for controlling the admission of an air charge to said combustion chamber, means defining an air chamber communicating with said intake port for supplying an air charge to said intake port, means for varying the effective volume of said air chamber in response to at least one engine running condition during at least a range of operation of said engine for varying the volume of air which is supplied to said combustion chamber from said air chamber, control valve means for communicating atmospheric air to said air chamber during the portion of the engine cycle when said intake part is closed, and a fuel injector for injecting fuel into said air chamber.

13. The induction system for an internal combustion engine as set forth in claim 12, further including means for delivering air at substantially atmospheric air pressure into the path of fuel sprayed by the fuel injector for atomizing and assisting in the evaporation of the fuel.

14. The induction system for an internal combustion engine as set forth in claim 13, wherein the first valve comprises a sliding piston.

15. The induction system for an internal combustion engine as set forth in claim 14, wherein the volume of the air chamber is varied in response to the operator demand and the load on the engine.

16. The induction system for an internal combustion engine as set forth in claim 15, wherein the second valve comprises a valve movable between an opened position and a closed position at a time when the intake port is closed.

17. The induction system for an internal combustion engine as set forth in claim 16, wherein the sliding piston valve is movable into a chamber when in its fully opened position, which chamber forms an extension of the air chamber.

18. The induction system for an internal combustion engine as set forth in claim 17, further including means for admitting atmospheric air to the chamber.

19. The induction system for an internal combustion engine as set forth in claim 14, wherein the opening and closing of the second valve is accomplished in timed relationship to the engine cycle.

20. The induction system for an internal combustion engine as set forth in claim 14, wherein the timing of opening and closing of the second control valve is variable for controlling the amount of air admitted to the air chamber.

21. A method of inducting a charge into an internal combustion engine having a combustion chamber with a volume that varies cyclicly during a cycle of engine operation, an intake port for admitting an air charge to the combustion chamber, and means for cyclicly opening and closing said intake port for controlling the admission of an air charge to said combustion chamber, said method comprising the steps of providing a variable volume of air at substantially atmospheric air pressure for supplying an air charge to the intake port, adjusting the effective volume of air supplied in response to the operator demand and the load on the engine during at least a range of operation of the engine for controlling the volume of air that is supplied to the combustion chamber, and communicating atmospheric air to the air chamber during the portion of the engine cycle when the intake port is closed for replenishing an air for the intake port with air at atmospheric pressure.

22. The method of inducting a charge into an internal combustion engine as set forth in claim 21, wherein there is no throttling of the air delivered to the combustion chamber by the induction system.

23. The method of inducting a charge into an internal combustion engine as set forth in claim 21, wherein the effective volume of the air supplied is controlled by a first valve and a second valve controls the flow to the air chamber from an atmospheric air inlet.

24. The method of inducting a charge into an internal combustion engine as set forth in claim 23, wherein the first valve comprises a sliding piston.

25. The method of inducting a charge into an internal combustion engine as set forth in claim 24, wherein the second valve comprises a valve movable between an opened position and a closed position at a time when the intake port is closed.

26. The method of inducting a charge into an internal combustion engine as set forth in claim 24, wherein the opening and closing of the second valve is accomplished in timed relationship to the engine cycle.

27. The method of inducting a charge into an internal combustion engine as set forth in claim 24, wherein the timing of opening and closing of the second control valve is variable for controlling the amount of air admitted to the air chamber.

28. The method of inducting a charge into an internal combustion engine as set forth in claim 23, further including the step of injecting fuel into the engine for combustion.

29. A method of inducting a charge into an internal combustion engine having a combustion chamber with a volume that varies cyclicly during a cycle of engine operation an intake port for admitting an air charge to the combustion chamber, and means for cyclicly opening and closing said intake port for controlling the admission of an air charge to said combustion chamber, said method comprising the steps of providing a variable volume of air at substantially atmospheric air pressure for supplying an air charge to the intake port, varying the effective volume of air supplied in response to at least one engine running condition during at least a range of operation of the engine for varying the volume of air that is supplied to the combustion chamber, communicating atmospheric air to the air chamber during the portion of the engine cycle when the intake port is closed for replenishing an air for the intake port with air at atmospheric pressure, and injecting fuel into the air chamber.

30. The method of inducting a charge into an internal combustion engine as set forth in claim 29, further including delivering air at substantially atmospheric air pressure into the path of fuel injected for atomizing and assisting in the evaporation of the fuel.

31. The method of inducting a charge into an internal combustion engine as set forth in claim 30, wherein the first valve comprises a sliding piston.

32. The method of inducting a charge into an internal combustion engine as set forth in claim 31, wherein the volume of the variable volume chamber is varied in response to the operator demand and the load on the engine.

33. The method of inducting a charge into an internal combustion engine as set forth in claim 32, wherein the second valve comprises a valve movable between an opened position and a closed position at a time when the intake port is closed.

34. The method of inducting a charge into an internal combustion engine as set forth in claim 33, wherein the sliding piston valve is movable into a chamber when in its fully opened position, which chamber forms an extension of the air chamber.

35. The method of inducting a charge into an internal combustion engine as set forth in claim 34, further including means for admitting atmospheric air to the chamber.

* * * * *